(12) United States Patent
Yanashita et al.

(10) Patent No.: US 12,517,033 B2
(45) Date of Patent: Jan. 6, 2026

(54) INFORMATION PROCESSING APPARATUS, FLOW CYTOMETER SYSTEM, SORTING SYSTEM, AND INFORMATION PROCESSING METHOD

(71) Applicant: Sony Group Corporation, Tokyo (JP)

(72) Inventors: Yudai Yanashita, Kanagawa (JP); Yasunobu Kato, Kanagawa (JP); Kenji Yamane, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 409 days.

(21) Appl. No.: 18/019,458

(22) PCT Filed: Aug. 3, 2021

(86) PCT No.: PCT/JP2021/028740
§ 371 (c)(1),
(2) Date: Feb. 2, 2023

(87) PCT Pub. No.: WO2022/034830
PCT Pub. Date: Feb. 17, 2022

(65) Prior Publication Data
US 2023/0296492 A1  Sep. 21, 2023

(30) Foreign Application Priority Data
Aug. 13, 2020  (JP) .................. 2020-136770

(51) Int. Cl.
*G01N 15/1429* (2024.01)
*G01N 15/1434* (2024.01)
(Continued)

(52) U.S. Cl.
CPC ..... *G01N 15/1429* (2013.01); *G01N 15/1434* (2013.01); *G06N 3/0455* (2023.01);
(Continued)

(58) Field of Classification Search
USPC .......................................................... 702/25
See application file for complete search history.

(56) References Cited

U.S. PATENT DOCUMENTS 11,156,969 B1 * 10/2021 Kim ..................... G06F 18/214
2015/0093779 A1    4/2015 Wirtz et al.
(Continued)

FOREIGN PATENT DOCUMENTS

JP      2019-512697 A     5/2019
WO   WO 2018/181458 A1  10/2018
(Continued)

OTHER PUBLICATIONS

International Search Report and English translation thereof mailed Sep. 21, 2021 in connection with International Application No. PCT/JP2021/028740.

*Primary Examiner* — Paul D Lee
(74) *Attorney, Agent, or Firm* — Wolf, Greenfield & Sacks, P.C.

(57) ABSTRACT

An information processing apparatus including a dimension compression section that generates dimension-compressed data for input data on the basis of a learning model generated by a neural network in which same data acquired from a biologically derived substance is applied to an input layer and an output layer.

13 Claims, 13 Drawing Sheets

(51) Int. Cl.
    *G06N 3/0455*    (2023.01)
    *G06N 3/08*    (2023.01)
    *G01N 15/10*    (2006.01)
    *G01N 15/149*    (2024.01)

(52) U.S. Cl.
    CPC ....... *G06N 3/08* (2013.01); *G01N 2015/1006* (2013.01); *G01N 15/149* (2024.01)

(56) References Cited

U.S. PATENT DOCUMENTS

| | | | |
|---|---|---|---|
| 2019/0195774 A1 | 6/2019 | El-Zehiry et al. | |
| 2020/0027020 A1 | 1/2020 | Kamesawa et al. | |
| 2020/0200671 A1* | 6/2020 | Yamane | G06F 18/23 |
| 2021/0049346 A1* | 2/2021 | Skala | G06F 18/2178 |
| 2021/0071256 A1* | 3/2021 | Quigley | G06N 3/08 |
| 2021/0303818 A1* | 9/2021 | Randolph | G06N 3/084 |
| 2022/0348903 A1* | 11/2022 | Ranganathan | G16B 25/10 |

FOREIGN PATENT DOCUMENTS

| | | |
|---|---|---|
| WO | WO 2018/217933 A1 | 11/2018 |
| WO | WO 2020/100667 A1 | 5/2020 |

\* cited by examiner

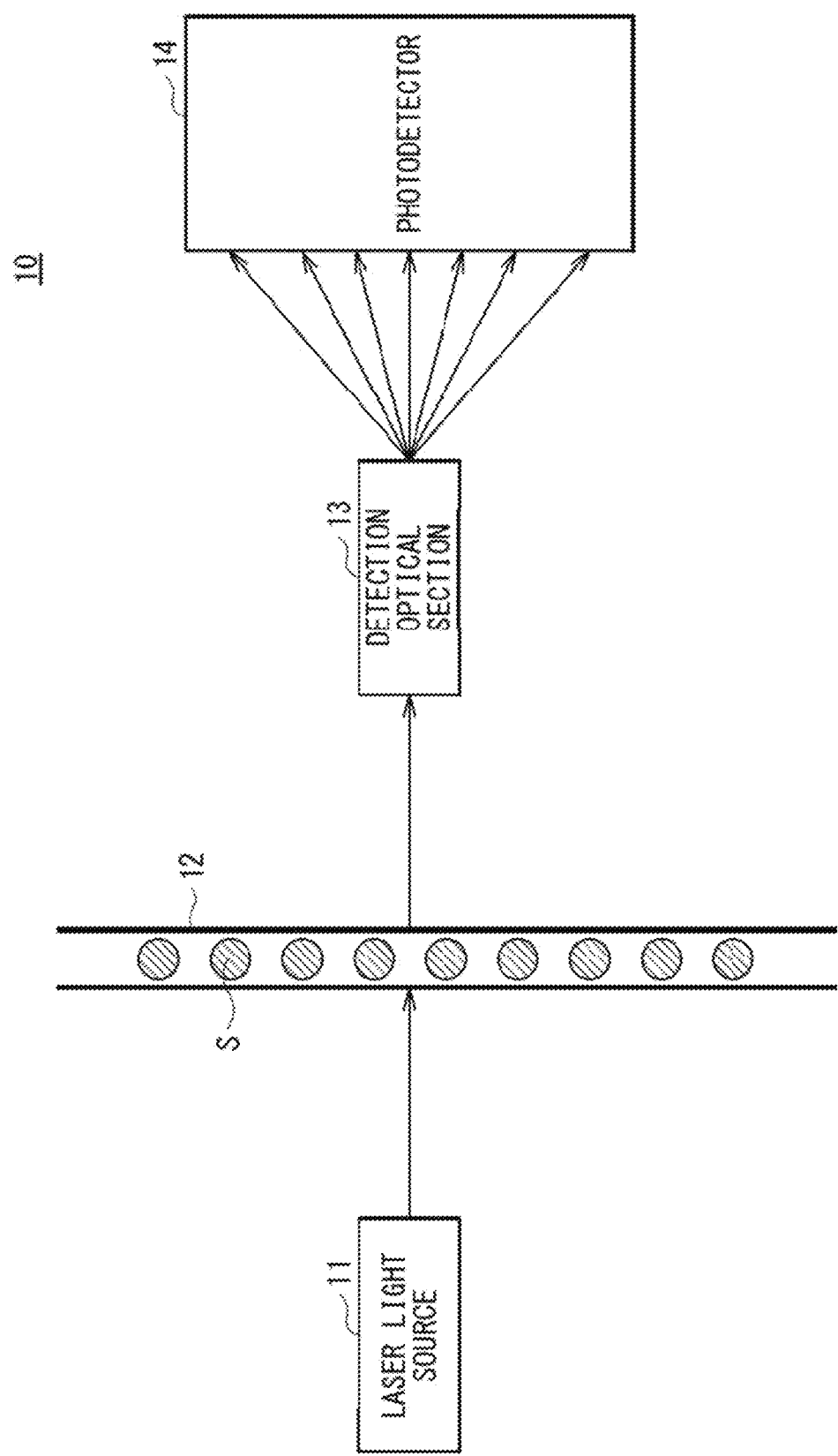

[FIG. 2]
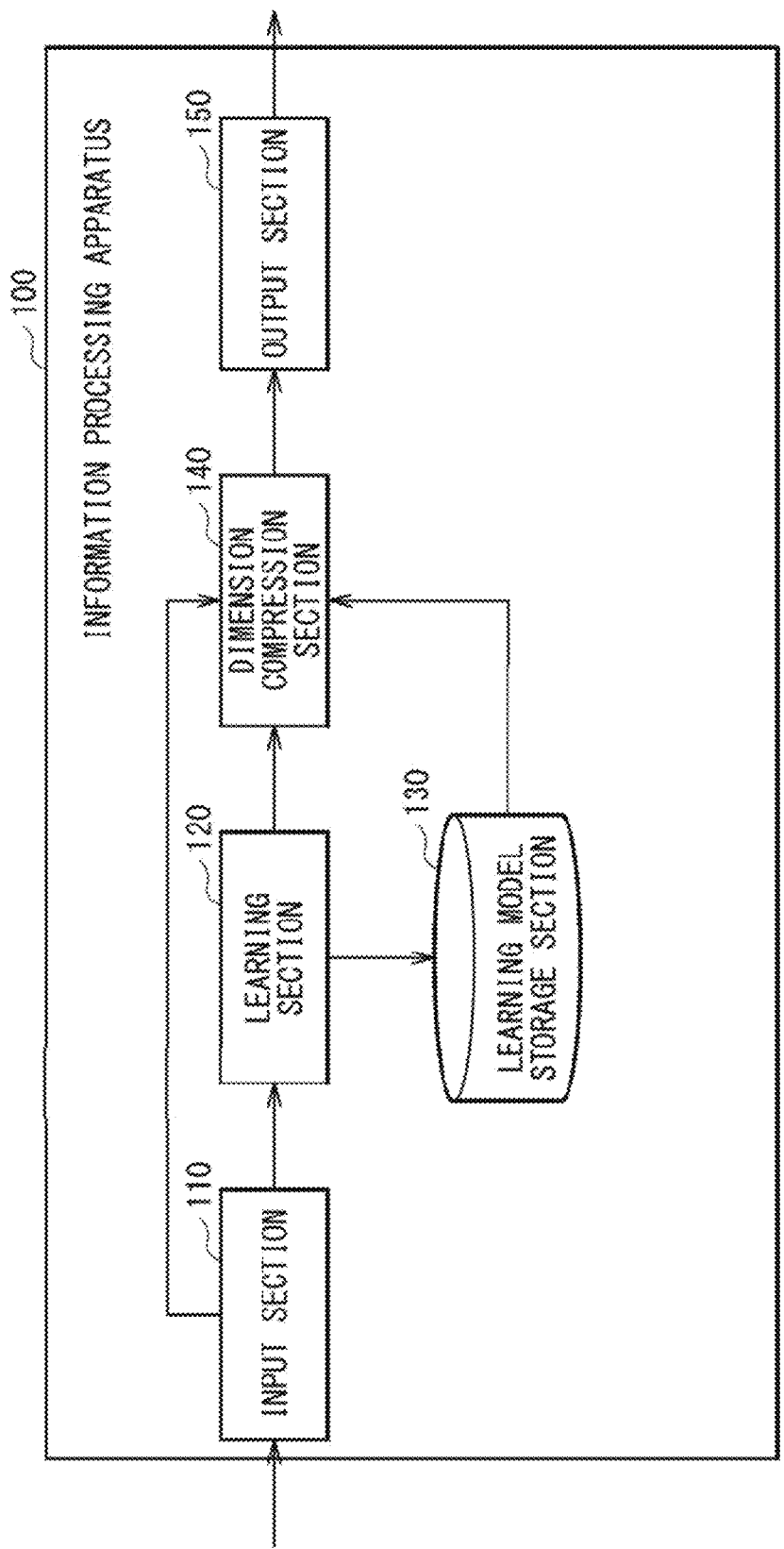

[FIG. 3]
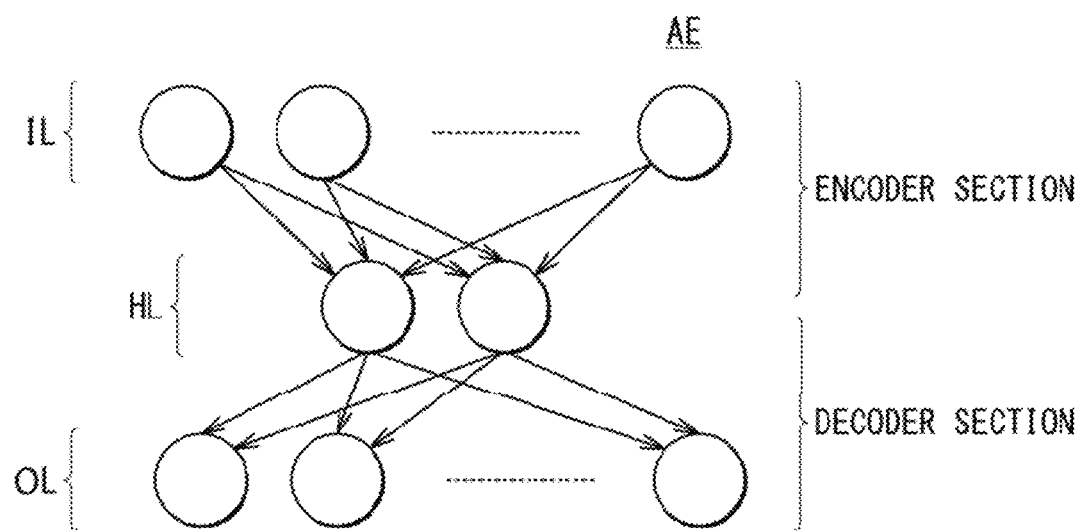

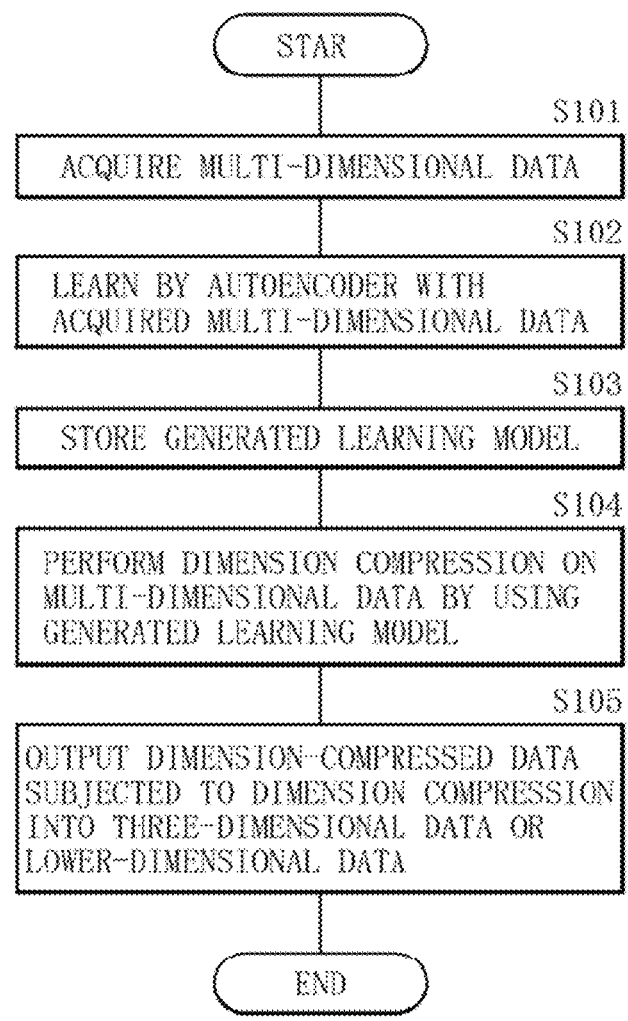

[ FIG. 5 ]
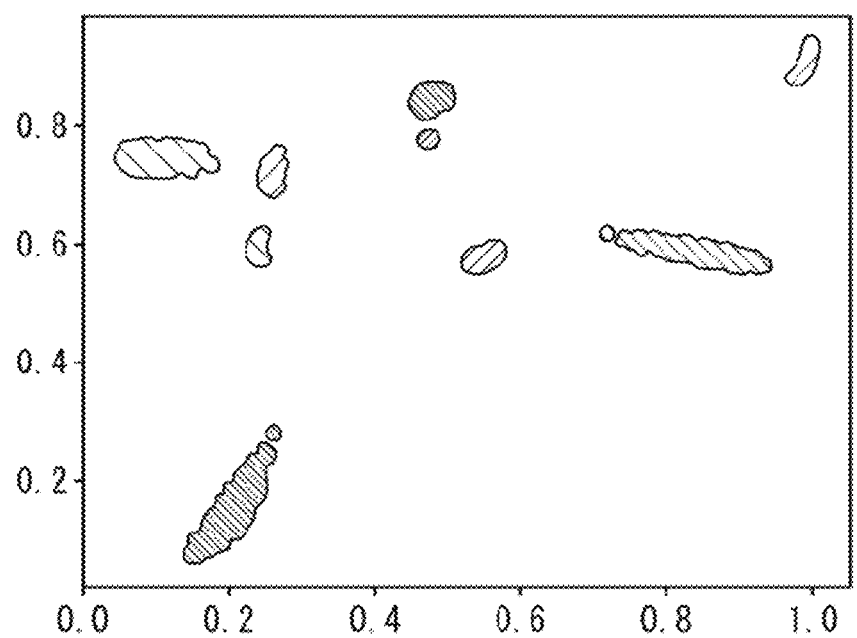
[ FIG. 6 ]
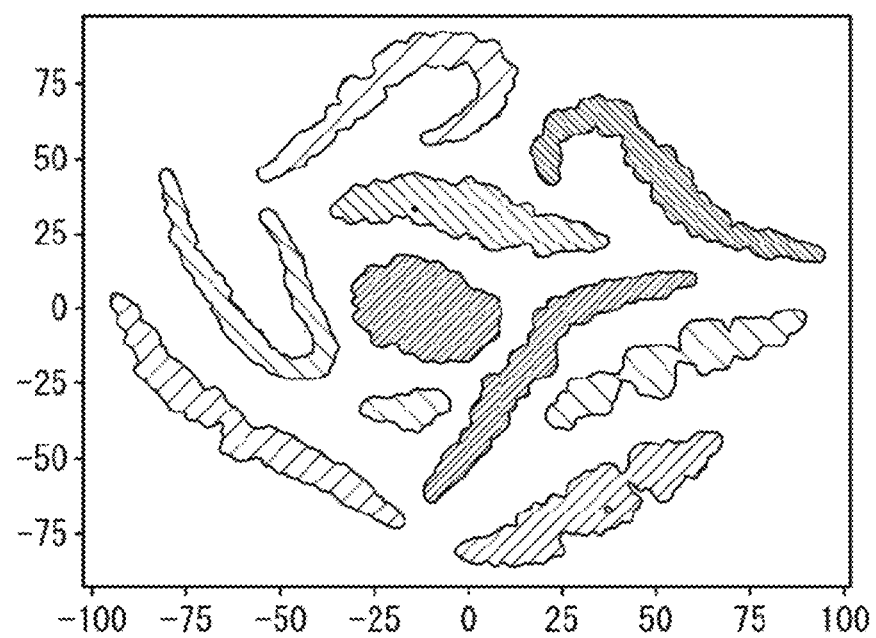

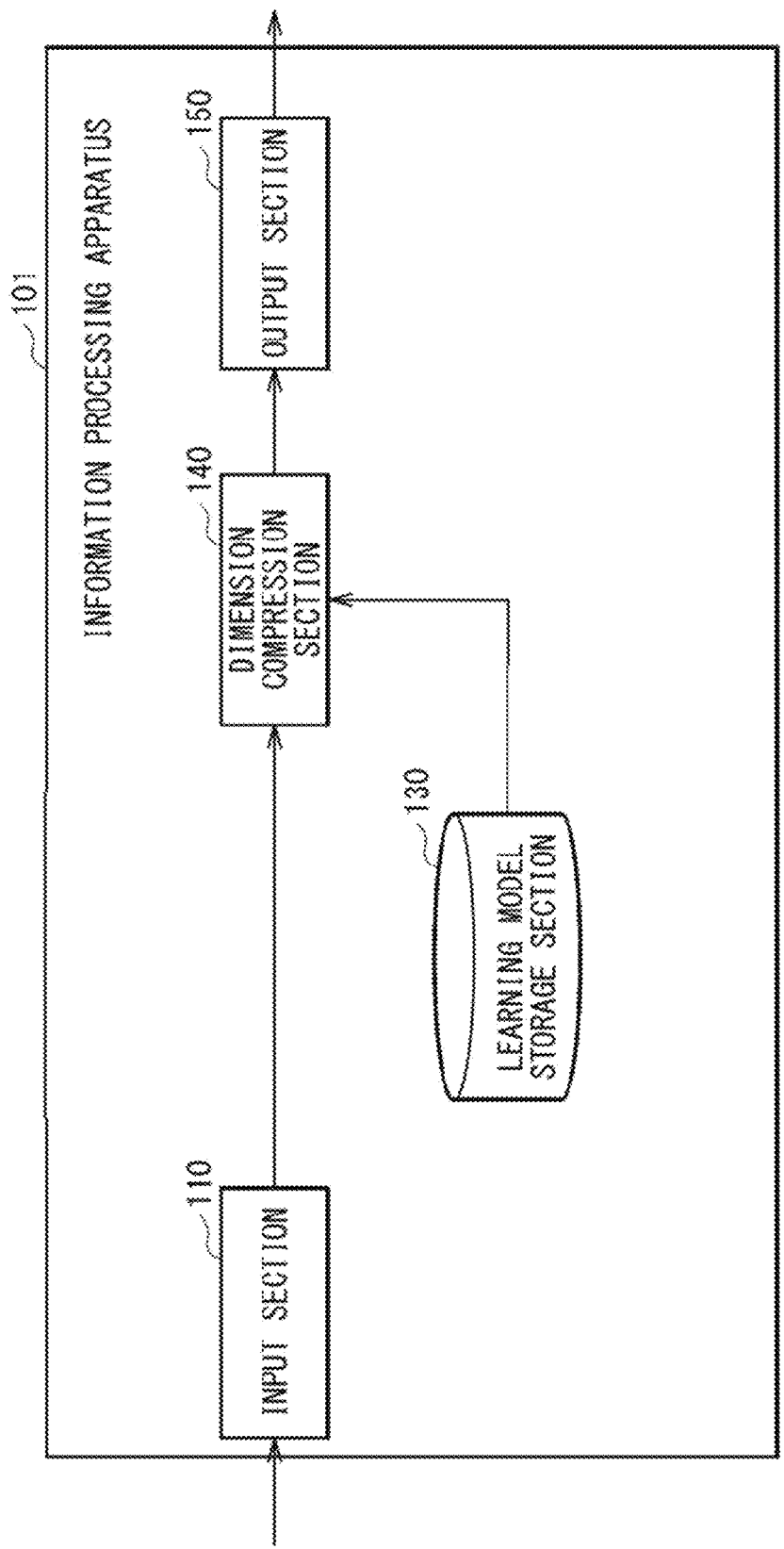
[FIG. 7]

[ FIG. 8 ]
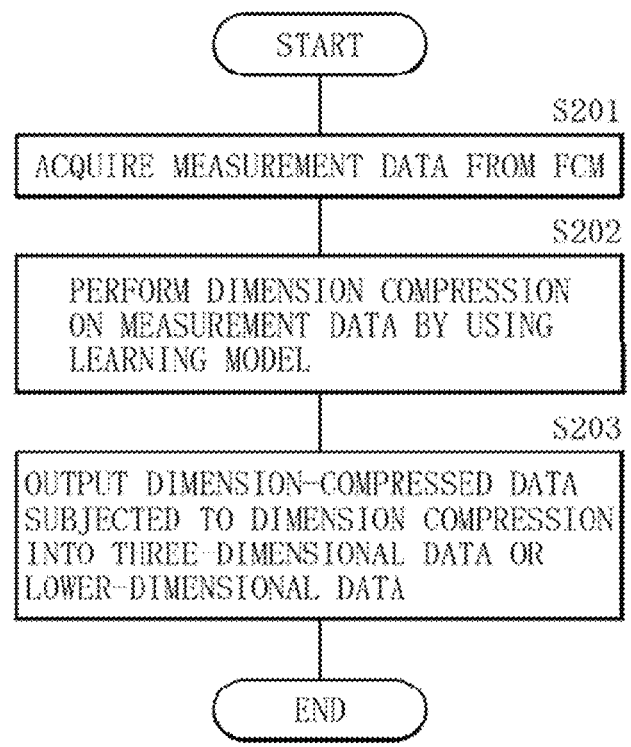

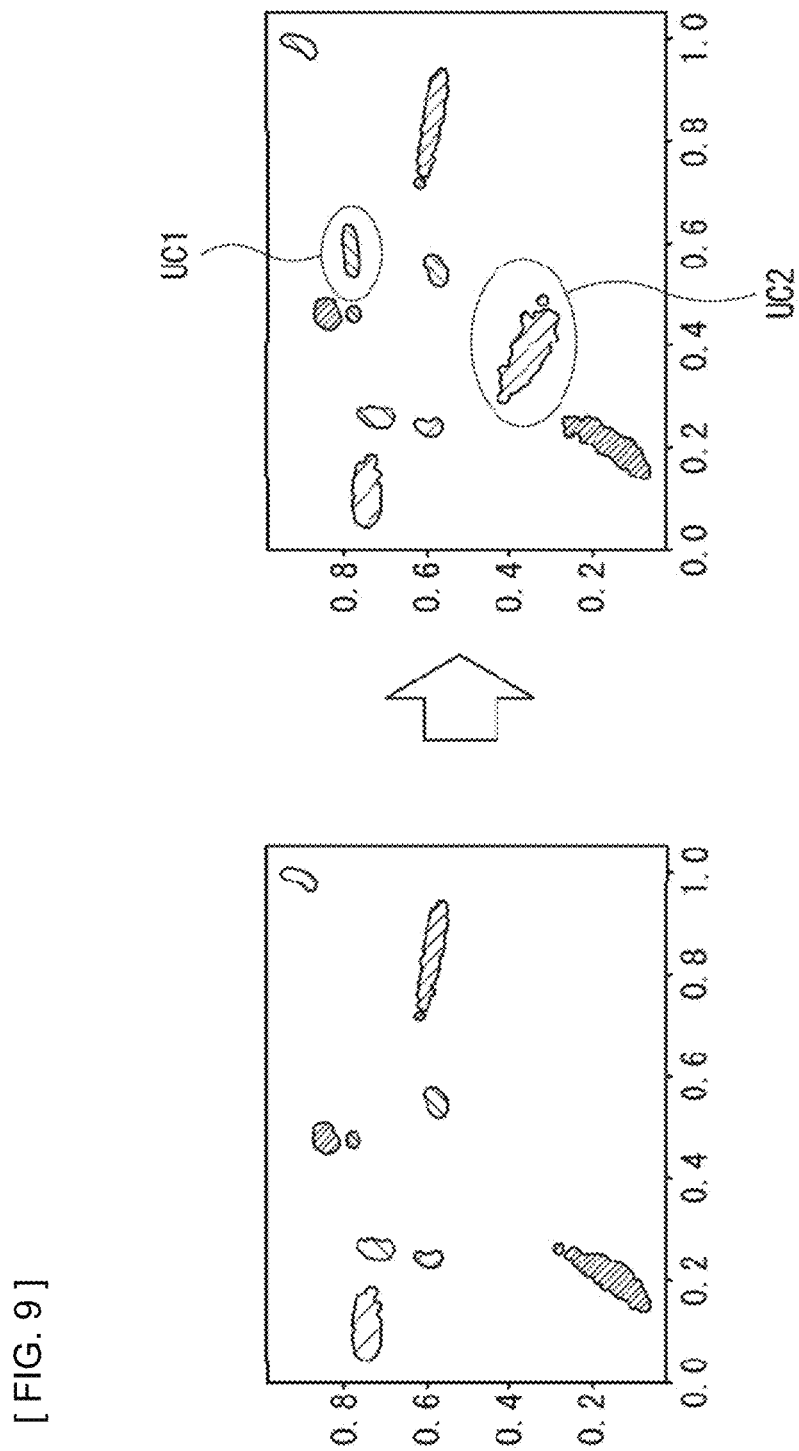
[FIG. 9]

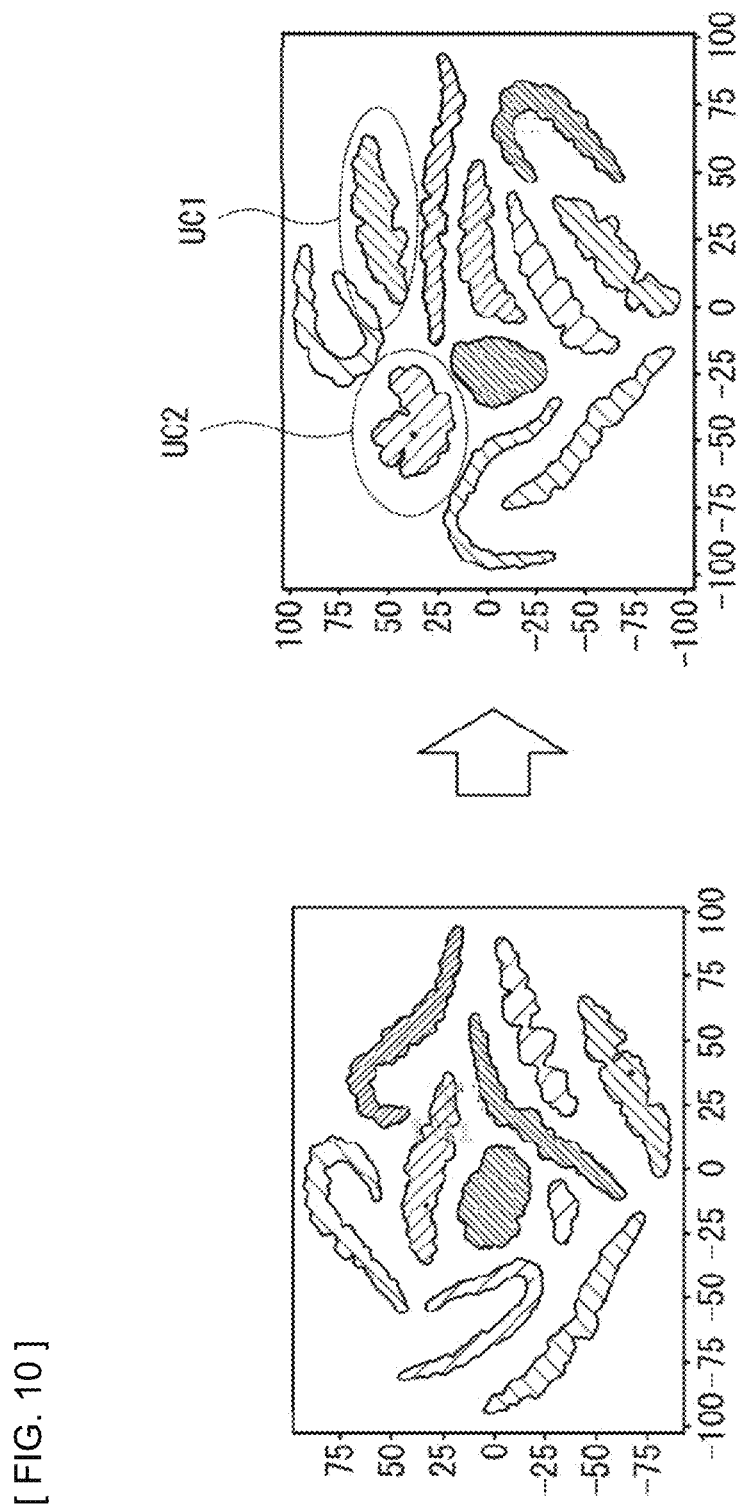
[FIG. 10]

[FIG. 11]
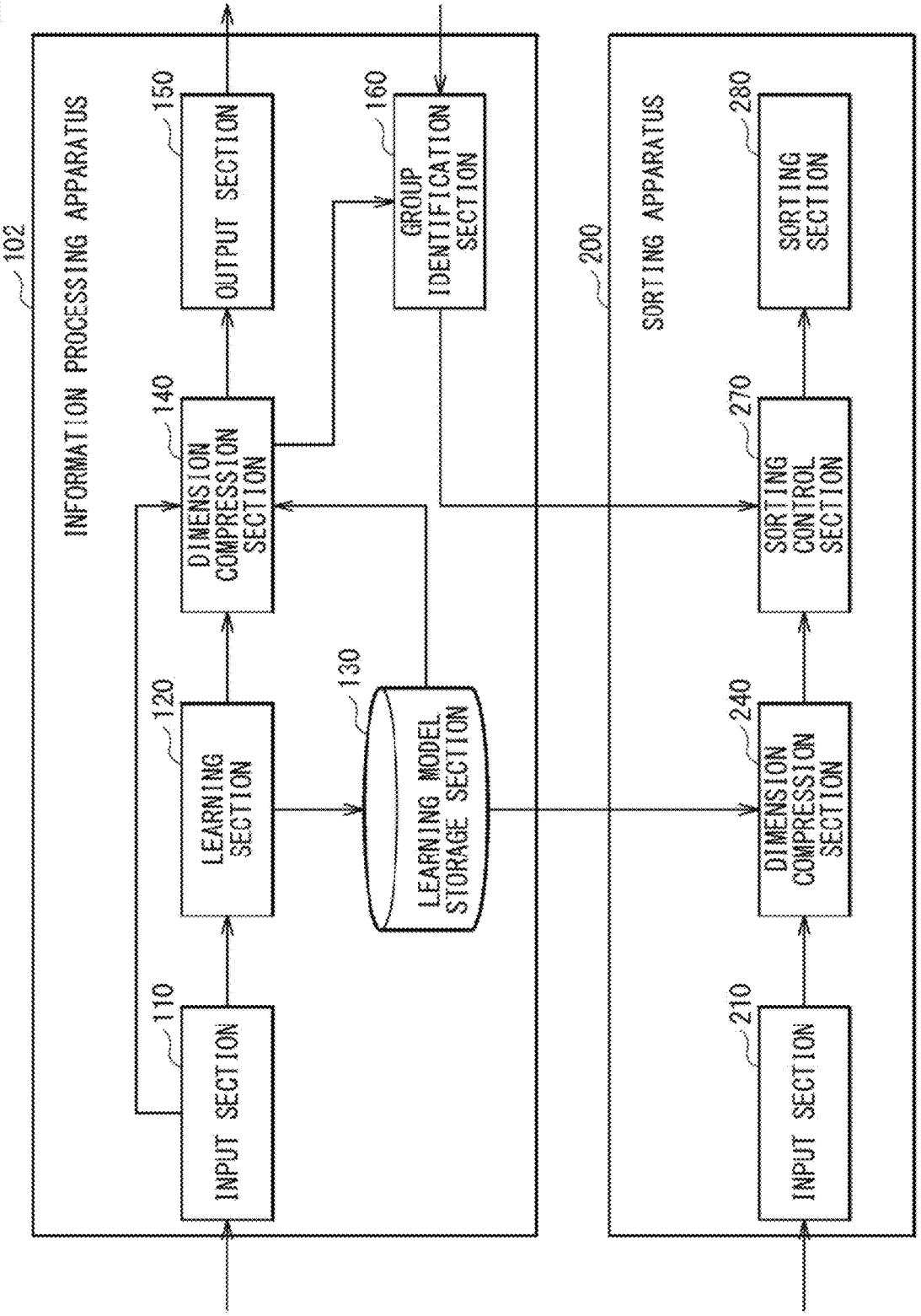

[ FIG. 12 ]
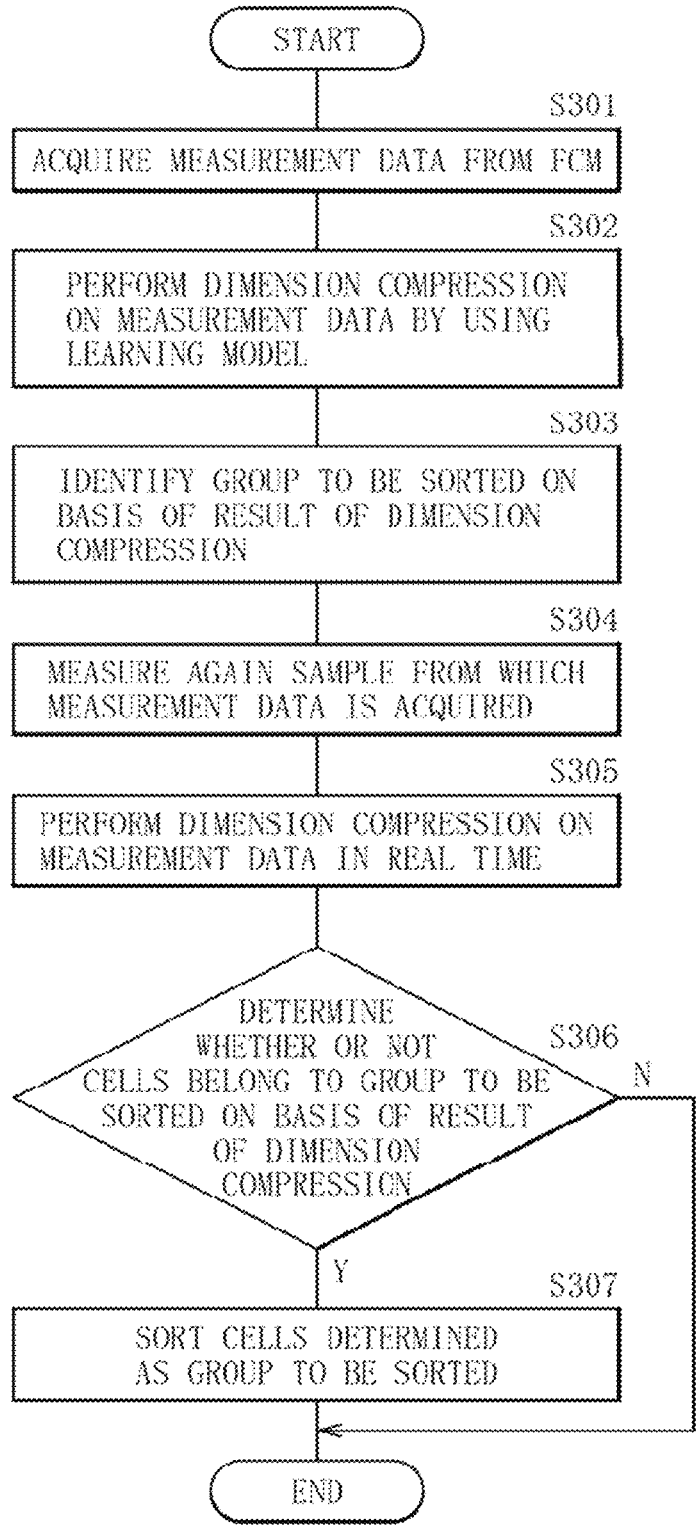

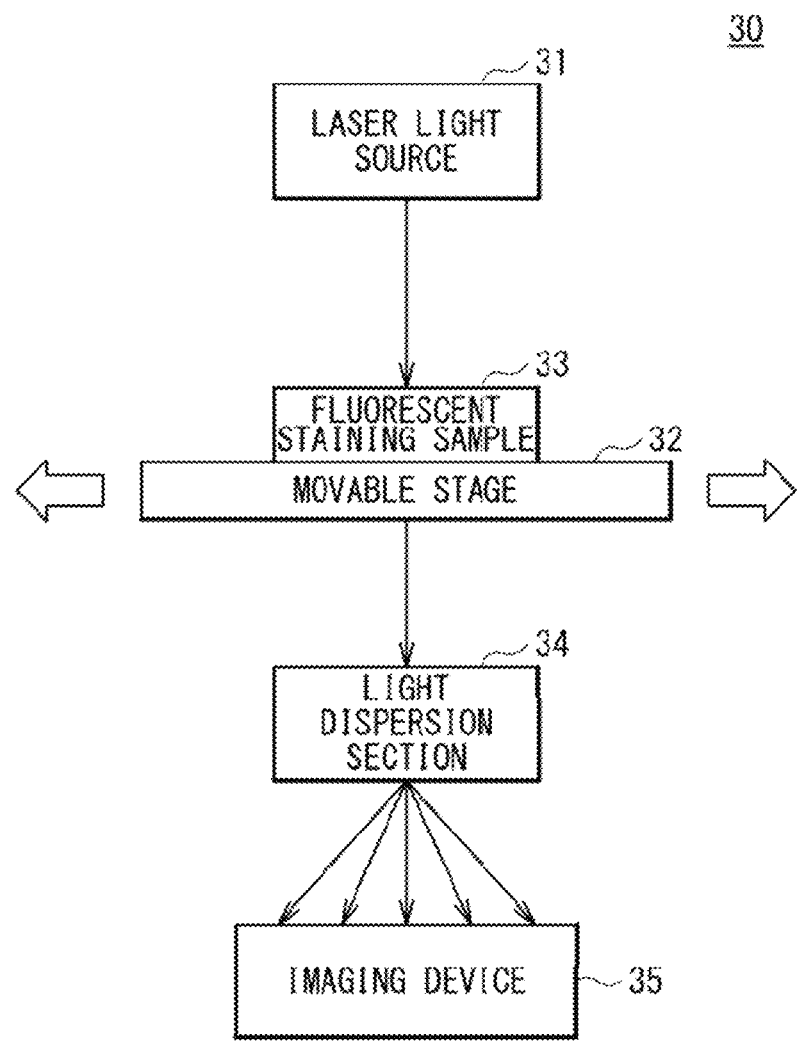
[FIG. 13]

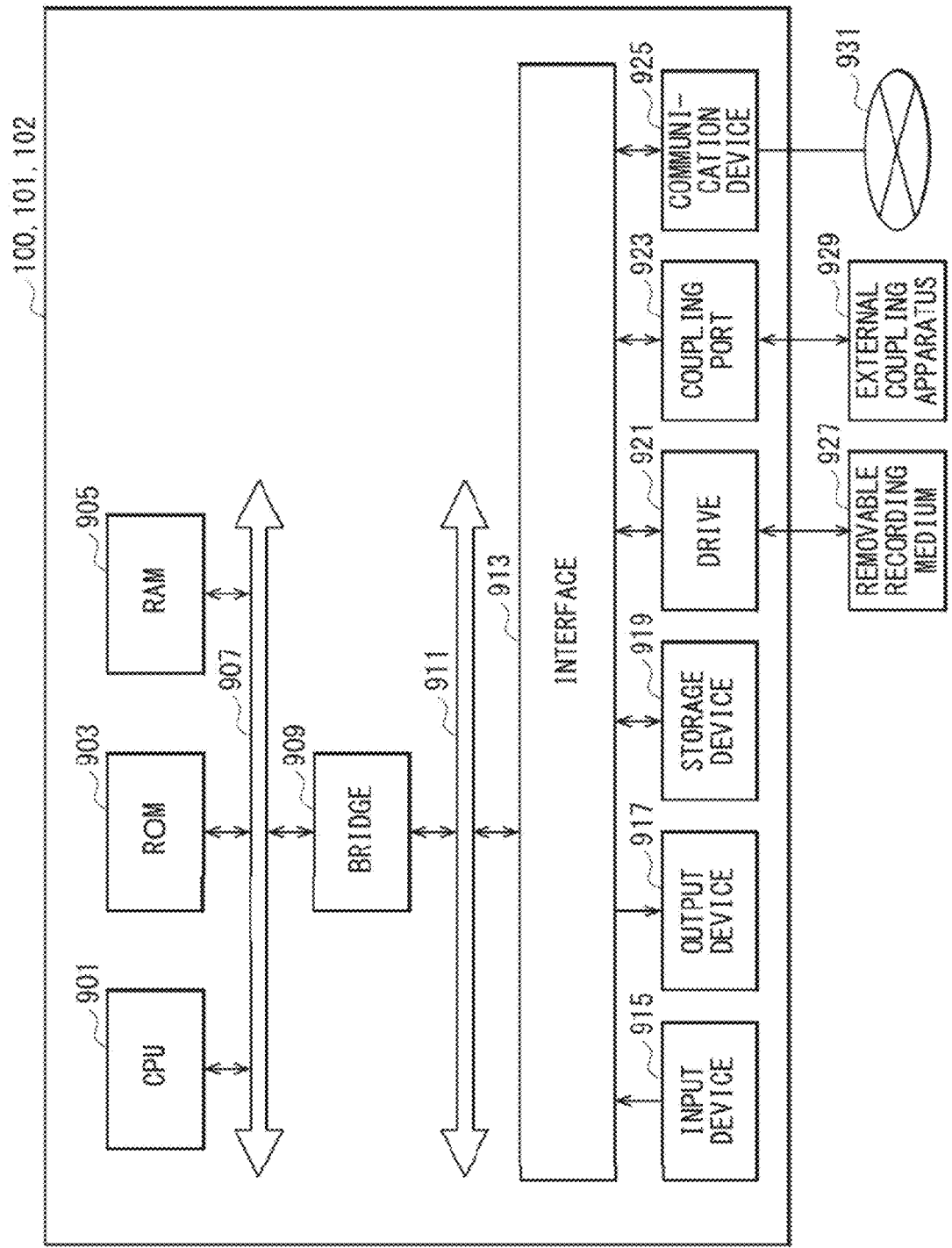
[ FIG. 14 ]

INFORMATION PROCESSING APPARATUS, FLOW CYTOMETER SYSTEM, SORTING SYSTEM, AND INFORMATION PROCESSING METHOD

CROSS-REFERENCE TO RELATED APPLICATIONS

This application claims the benefit under 35 U.S.C. § 371 as a U.S. National Stage Entry of International Application No. PCT/JP2021/028740, filed in the Japanese Patent Office as a Receiving Office on Aug. 3, 2021, which claims priority to Japanese Patent Application Number JP2020-136770, filed in the Japanese Patent Office on Aug. 13, 2020, each of which is hereby incorporated by reference in its entirety.

TECHNICAL FIELD

The present disclosure relates to an information processing apparatus, a flow cytometer system, a sorting system, and an information processing method.

BACKGROUND ART

In recent years, flow cytometers have been used in the medical and biochemical fields to rapidly measure the characteristics of a large number of particles. Each of the flow cytometers is an analysis apparatus that measures the characteristics of particles flowing in a flow path referred to as flow cell by irradiating the particles with light and analyzing pieces of fluorescent light and pieces of scattered light emitted from the particles.

In addition, in the medical and biochemical fields, cells or tissue stained with a plurality of fluorescent dyes are measured with a fluorescence microscope, thereby analyzing the internal structure or movement of the cells or the tissue.

The analysis apparatus including such a flow cytometer, a fluorescence microscope, and the like disperses, for example, pieces of fluorescent light from a plurality of fluorescent dyes and detects the dispersed pieces of fluorescent light by using a light receiver array in which a plurality of light receivers having different detection wavelength ranges is arranged. The analysis apparatus including such a flow cytometer, a fluorescence microscope, and the like thus offers, as measurement data, multi-dimensional data including the detection values of the respective light receivers. For example, a variety of proposals have been made with respect to methods of analyzing multi-dimensional data by using a flow cytometer (e.g., PTL 1).

CITATION LIST

Patent Literature

PTL 1: International Publication No. WO 2018/217933

SUMMARY OF THE INVENTION

An analysis apparatus that acquires multi-dimensional data is requested to perform dimension compression on the multi-dimensional data more rapidly with higher accuracy to analyze the multi-dimensional data more easily.

It is thus desirable to provide an information processing apparatus, a sorting system, an information processing method, and a program that each make it possible to perform dimension compression on multi-dimensional data more rapidly with higher accuracy.

A first information processing apparatus according to an embodiment of the present disclosure includes a dimension compression section that generates dimension-compressed data for input data on the basis of a learning model generated by a neural network in which same data acquired from a biologically derived substance is applied to an input layer and an output layer.

A second information processing apparatus according to an embodiment of the present disclosure includes a learning section that generates a learning model by using a neural network in which same multi-dimensional data acquired from a biologically derived substance is applied to an input layer and an output layer.

A flow cytometer system according to an embodiment of the present disclosure includes: a laser light source; a photodetector; and a dimension compression section. The laser light source irradiates a biologically derived particle with light. The biologically derived particle flows in a flow path. The photodetector detects light from the biologically derived particle. The dimension compression section generates dimension-compressed data for measurement data on the basis of a learning model. The measurement data is obtained by the photodetector. The learning model is generated by a neural network in which same data acquired from a biologically derived substance is applied to an input layer and an output layer.

A sorting system according to an embodiment of the present disclosure includes: a laser light source; a photodetector; a dimension compression section; and a sorting section. The laser light source irradiates a biologically derived particle with light. The biologically derived particle flows in a flow path. The photodetector detects light from the biologically derived particle. The dimension compression section generates dimension-compressed data for measurement data on the basis of a learning model. The measurement data is obtained by the photodetector. The sorting section sorts the biologically derived particle on the basis of the dimension-compressed data. The learning model is generated by a neural network in which same data acquired from a biologically derived substance is applied to an input layer and an output layer.

An information processing method according to an embodiment of the present disclosure includes generating, by an arithmetic processing device, dimension-compressed data for input data on the basis of a learning model generated by a neural network in which same data acquired from a biologically derived substance is applied to an input layer and an output layer.

A program according to an embodiment of the present disclosure causes a computer to function as a dimension compression section that generates dimension-compressed data for input data on the basis of a learning model generated by a neural network in which same data acquired from a biologically derived substance is applied to an input layer and an output layer.

In the information processing apparatus, the flow cytometer system, the sorting system, the information processing method, and the program according to the respective embodiments of the present disclosure, the dimension-compressed data for the input data or the measurement data is generated on the basis of the learning model generated by the neural network in which the same data is applied to the input layer and the output layer. This makes it possible to subject, for example, the input data or the measurement data to dimension compression by using the learning model that has already been learned in the dimension compression method in which no stochastic process is performed.

BRIEF DESCRIPTION OF DRAWING

FIG. 1 is a schematic diagram illustrating a schematic configuration of a flow cytometer.

FIG. 2 is a block diagram illustrating a functional configuration of an information processing apparatus according to a first embodiment of the present disclosure.

FIG. 3 is an explanatory diagram describing a learning model generated by a learning section.

FIG. 4 is a flowchart diagram illustrating an example of an operation flow of the information processing apparatus according to the embodiment.

FIG. 5 is a graphical chart illustrating a result of dimension compression by the information processing apparatus according to the embodiment.

FIG. 6 is a graphical chart illustrating a result of dimension compression according to a comparative example.

FIG. 7 is a block diagram illustrating a functional configuration of an information processing apparatus according to a second embodiment of the present disclosure.

FIG. 8 is a flowchart diagram illustrating an example of an operation flow of the information processing apparatus according to the embodiment.

FIG. 9 is a graphical chart illustrating a result of dimension compression by the information processing apparatus according to the embodiment.

FIG. 10 is a graphical chart illustrating a result of dimension compression according to a comparative example.

FIG. 11 is a block diagram illustrating a functional configuration of a sorting system according to a third embodiment of the present disclosure.

FIG. 12 is a flowchart diagram illustrating an example of an operation flow of the sorting system according to the embodiment.

FIG. 13 is a schematic diagram illustrating a schematic configuration of a fluorescent light imaging apparatus.

FIG. 14 is a block diagram illustrating a hardware configuration example of the information processing apparatus according to each of the embodiments of the present disclosure.

MODES FOR CARRYING OUT THE INVENTION

The following describes embodiments of the present disclosure in detail with reference to the drawings. The embodiments described below are specific examples of the present disclosure. The technology according to the present disclosure should not be limited to the following modes. In addition, the disposition, dimensions, dimensional ratios, and the like of the respective components according to the present disclosure are not limited to the modes illustrated in the drawings.

It is to be noted that description is given in the following order.

1. First Embodiment
1.1. Overview of Flow Cytometer
1.2. Configuration Example of Information Processing Apparatus
1.3. Operation Example of Information Processing Apparatus
1.4. Working Example of Dimension Compression
2. Second Embodiment
2.1. Configuration Example of Information Processing Apparatus
2.2. Operation Example of Information Processing Apparatus
2.3. Working Example of Dimension Compression
3. Third Embodiment
3.1. Configuration Example of Sorting System
3.2. Operation Example of Sorting System
4. Modification Example
5. Hardware Configuration Example

1. First Embodiment (1.1. Overview of Flow Cytometer)

First, an overview of a flow cytometer to which the technology according to the present disclosure is applied is described with reference to FIG. 1. FIG. 1 is a schematic diagram illustrating a schematic configuration of a flow cytometer 10.

As illustrated in FIG. 1, the flow cytometer 10 includes a laser light source 11, a flow cell 12, a detection optical section 13, and a photodetector 14.

The flow cytometer 10 irradiates measurement targets S with laser light from the laser light source 11 and disperses fluorescent light or scattered light from each of the measurement targets S by using the detection optical section 13. The measurement targets S flow in the flow cell 12 at high speed. This allows the flow cytometer 10 to detect the fluorescent light or the scattered light dispersed by the detection optical section 13 by using the photodetector 14.

The measurement targets S of the flow cytometer 10 are, for example, biologically derived particles such as cells, tissue, microorganisms, or bio-related particles stained with a plurality of fluorescent dyes. For example, the cells may be animal cells (blood cells), plant cells, or the like. For example, the tissue may be tissue taken from a human body or the like or a portion of the tissue (including tissue cells). The microorganisms may include, for example, bacteria such as *Escherichia coli*, viruses such as a tobacco mosaic virus, or fungi such as yeast. For example, the bio-related particles may be a variety of organelles (cell organelles) such as chromosomes, liposomes, or mitochondria included in cells. Alternatively, the bio-related particles may be bio-related macromolecules such as nucleic acids, protein, lipid, sugar chains, or complexes thereof. These biologically derived particles may each have any of a spherical shape or a non-spherical shape. The biologically derived particles are not also particularly limited in size or mass.

In addition, the measurement targets S of the flow cytometer 10 may be artificial particles such as latex particles, gel particles, or industrial particles. For example, the industrial particles may be particles synthesized by using organic resin materials such as polystyrene or polymethyl methacrylate, inorganic materials such as glass, silica, or magnetic substances, or metals such as gold colloid or aluminum. Similarly, these artificial particles may each have any of a spherical shape or a non-spherical shape. The artificial particles are not also particularly limited in size or mass.

The measurement targets S may be stained (labeled) in advance with a plurality of fluorescent dyes. The measurement targets S may be labeled with fluorescent dyes in a known method. Specifically, in a case where the measurement targets S are cells, it is possible to fluorescently label the measurement target cells by mixing fluorescently labeled antibodies and the measurement target cells and binding the fluorescently labeled antibodies to the antigens present on the surfaces of the cells. The fluorescently labeled antibodies are selectively bound to the antigens on the surfaces of the cells. Alternatively, it is possible to fluorescently label the measurement target cells by mixing fluorescent dyes and the measurement target cells and causing the cells to take in the fluorescent dyes. The fluorescent dyes are selectively taken in specific cells.

It is to be noted that the fluorescently labeled antibodies are antibodies to which fluorescent dyes are bound as labels. For example, the fluorescently labeled antibodies may be antibodies to which fluorescent dyes are directly bound. Alternatively, the fluorescently labeled antibodies may be obtained by biding fluorescent dyes obtained by binding avidin to biotin-labeled antibodies through avidin-biotin reaction. The antibodies may be any of polyclonal antibodies or monoclonal antibodies. The fluorescent dyes may be known dyes that are used, for example, to stain cells.

The laser light source 11 emits, for example, laser light having a wavelength that is able to excite fluorescent dyes used to stain the measurement targets S. In a case where a plurality of fluorescent dyes is used to stain the measurement targets S, the plurality of laser light sources 11 may be provided in accordance with the excitation wavelengths of the plurality of respective fluorescent dyes. For example, the laser light source 11 may be a semiconductor laser light source. The laser light emitted from the laser light source 11 may be pulse light or continuous light.

The flow cell 12 is a flow path that aligns the measurement targets S such as cells in one direction and has the measurement targets S flow therein. Specifically, the flow cell 12 allows the measurement targets S to be aligned in one direction and flow by causing a sheath liquid to flow at high speed as a laminar flow. The sheath liquid wraps a sample liquid including the measurement targets S. The measurement targets S flowing in the flow cell 12 are irradiated with laser light from the laser light source 11. Pieces of fluorescent light or pieces of scattered light from the measurement targets S irradiated with the laser light pass through the detection optical section 13. After that, the pieces of fluorescent light or the pieces of scattered light are detected by the photodetector 14.

The detection optical section 13 is an optical element that causes light in a predetermined detection wavelength range among pieces of light emitted from the measurement targets S irradiated with laser light to reach the photodetector 14. The detection optical section 13 may be, for example, a prism, a grating, or the like. In addition, alternatively, the detection optical section 13 may be an optical element that separates pieces of fluorescent light emitted from the measurement targets S irradiated with laser light for each of the predetermined detection wavelength ranges. In such a case, the detection optical section 13 includes, for example, at least one or more dichroic mirrors or optical filters. The detection optical section 13 is able to separate pieces of fluorescent light from the measurement targets S into pieces of light in a predetermined detection wavelength range by using optical members such as dichroic mirrors and optical filters. The pieces of light in the predetermined detection wavelength range separated by the detection optical section 13 may be thus each detected by the corresponding photodetector 14.

The photodetector 14 includes a light receiver group that detects pieces of fluorescent light or pieces of scattered light emitted from the measurement targets S irradiated with laser light. The light receiver group may be a light receiver array in which, for example, a plurality of light receivers such as photomultiplier tubes (PMT: PhotoMultiplier Tube) or photodiodes that are able to detect pieces of light in different wavelength ranges is one-dimensionally arranged along the light separation direction of the detection optical section 13. In addition, the photodetector 14 may alternatively include, for example, a plurality of light receivers that is the same in number as fluorescent dyes to receive the pieces of light separated by a detection optical section 14 and corresponding to the wavelength ranges of the fluorescent dyes. Further, the photodetector 14 may alternatively include, for example, an imaging element such as a CCD (Charge Coupled Device) sensor or a CMOS (Complementary Metal-Oxide-Semiconductor) sensor. In such a case, the photodetector 14 is able to acquire an image (e.g., a bright field image, a dark field image, a fluorescence image, or the like) of the measurement targets S by using the imaging element.

In the flow cytometer 10 having the configuration described above, pieces of fluorescent light and pieces of scattered light are emitted from the measurement targets S irradiated with laser light from the laser light source 11. The pieces of fluorescent light and the pieces of scattered light emitted from the measurement targets S are separated by the detection optical section 13 and then detected by the photodetector 14. The photodetector 14 detects the pieces of fluorescent light emitted from the measurement targets S by using the plurality of respective light receivers that is able to detect pieces of light in different wavelength ranges. In addition, the pieces of scattered light emitted from the measurement targets S are detected as pieces of forward-scattered light and pieces of side-scattered light. A result of detection by the flow cytometer 10 is thus acquired as multi-dimensional data.

(1.2. Configuration Example of Information Processing Apparatus)

Subsequently, an information processing apparatus according to a first embodiment of the present disclosure is described with reference to FIG. 2. FIG. 2 is a block diagram illustrating a functional configuration of an information processing apparatus 100 according to the present embodiment. The information processing apparatus according to the present embodiment makes it possible to analyze a result of measurement by the flow cytometer 10 or the like more easily by performing dimension compression on the result of the measurement by using a learning model generated by machine learning. The result of the measurement is outputted as multi-dimensional data. Here, the flow cytometer system includes the flow cytometer 10 and the information processing apparatus 100.

As illustrated in FIG. 2, the information processing apparatus 100 includes, for example, an input section 110, a learning section 120, a learning model storage section 130, a dimension compression section 140, and an output section 150.

The input section 110 is an input port for inputting multi-dimensional data to the information processing apparatus 100 as input data. Specifically, the input section 110 is a coupling port that is able to receive various kinds of data from an external device such as the flow cytometer 10. The input section 110 may be, for example, a USB (Universal Serial Bus) port, an IEEE 1394 port, an SCSI (Small Computer System Interface) port, or the like.

The multi-dimensional data inputted to the input section 110 may include, for example, data regarding the amounts of light received by the respective light receivers included in the photodetector 14 of the flow cytometer 10. Here, in a case where the respective light receivers receive pieces of light corresponding to the wavelength ranges of the fluorescent dyes, the data regarding the amounts of received light may correspond to data (such as Area, Height, or Width of the received light pulses) regarding the expression amounts of the fluorescent dyes. Alternatively, the multi-dimensional data inputted to the input section 110 may include data regarding the expression amounts of the fluorescent dyes calculated by analyzing the spectra of fluorescent light measured by the light receiver array. The multi-dimensional data may further include data regarding the detection intensity of forward-scattered light or side-scattered light.

The learning section 120 generates a learning model for performing dimension compression on multi-dimensional data. Specifically, the learning section 120 generates a learning model for performing dimension compression on multi-dimensional data without performing any stochastic process.

For example, a dimension compression method such as t-SNE (t-distributed Stochastic Neighbor Embedding: t-distributed stochastic neighbor embedding) uses probability distribution in the process of dimension compression, resulting in low reproducibility. Whenever a dimension compression process is performed, a result of the dimension compression may change. Specifically, even in a case where the same multi-dimensional data is inputted, the shape and the disposition of each of clusters resulting from dimension compression may change in a dimension compression method such as t-SNE. In addition, in a dimension compression method such as t-SNE, the shape of a cluster resulting from dimension compression may be distorted or the cluster may be divided. It is thus difficult in a dimension compression method such as t-SNE to compare results of dimension compression between a plurality of pieces of multi-dimensional data. This makes it difficult, for example, to discover an unknown cluster.

In contrast, dimension compression in which no stochastic process is performed uses no probability distribution or no random number, but allows for lossless dimension compression and restoration. A result of dimension compression thus has high reproducibility. It is therefore possible in dimension compression in which no stochastic process is performed to compare results of the dimension compression with each other between a plurality of pieces of multi-dimensional data. This allows the information processing apparatus 100 according to the present embodiment to identify a group (cluster) included in multi-dimensional data more easily by comparing results of dimension compression on a plurality of pieces of multi-dimensional data.

Specifically, the learning section 120 generates, as a learning model for performing dimension compression on multi-dimensional data, a learning model by using a neural network in which the same multi-dimensional data is applied to the input layer and the output layer. A learning model generated by the learning section 120 is specifically described with reference to FIG. 3. FIG. 3 is an explanatory diagram describing a learning model generated by the learning section 120.

For example, as illustrated in FIG. 3, the learning section 120 may generate a learning model by using a neural network including an input layer IL, at least one or more intermediate layers HL, and an output layer OL. The at least one or more intermediate layers HL each have a smaller number of nodes than the number of nodes of the input layer IL. The output layer OL has the same number of nodes as the number of nodes of the input layer IL. Such a neural network including the input layer IL, the intermediate layers HL, and the output layer OL is a so-called autoencoder AE. The learning section 120 applies the same multi-dimensional data to the input layer IL and the output layer OL and optimizes the network structure and the weighting of the autoencoder AE. In other words, the learning section 120 optimizes the network structure and the weighting of the autoencoder AE to minimize the difference between the multi-dimensional data inputted to the input layer IL and the multi-dimensional data outputted from the output layer OL. This allows the learning section 120 to generate, as a learning model, the autoencoder AE in which the network structure and the weighting are optimized.

For example, the autoencoder AE includes an encoder section from the input layer IL to the intermediate layer HL and a decoder section from the intermediate layer HL to the output layer OL.

In the encoder section, the values of the respective dimensions of multi-dimensional data are inputted to the respective nodes of the input layer IL. This causes the neural network to compress (encode) the features of the multi-dimensional data into the intermediate layer HL that has a smaller number of nodes than the number of nodes of the input layer IL. In the intermediate layers HL, the features of the multi-dimensional data are thus compressed into a smaller number of nodes (i.e., a smaller number of dimensions than the number of dimensions of the multi-dimensional data) than the number of nodes of the input layer IL. In other words, the values of the respective nodes of the intermediate layer HL are dimension-compressed data obtained by performing dimension compression on the multi-dimensional data.

In addition, in the decoder section, the features of the multi-dimensional data compressed into the intermediate layer HL are restored (decoded) by the neural network into the output layer OL that has the same number of nodes as the number of nodes of the input layer IL. The multi-dimensional data applied to the output layer OL is the same as the multi-dimensional data applied to the input layer IL. This allows the autoencoder AE to compress (encode) and restore (decode) the multi-dimensional data in a lossless manner.

It is to be noted that the two or more intermediate layers HL may be present. In such a case, the section from the input layer IL to the intermediate layer HL having the smallest number of nodes among the plurality of intermediate layers HL serves as an encoder section. The section from the intermediate layer HL having the smallest number of nodes among the plurality of intermediate layers HL to the output layer OL serves as a decoder section. In addition, the values of the respective nodes of the intermediate layer HL having the smallest number of nodes among the plurality of intermediate layers HL are dimension-compressed data obtained by performing dimension compression on multi-dimensional data.

This allows the learning section 120 to generate, by using, for example, a neural network in which the intermediate layer HL has two or three nodes, a learning model in which multi-dimensional data is subjected to dimension compression to two-dimensional data or three-dimensional data, which is easy for a user to visually recognize.

It is to be noted that the multi-dimensional data used to optimize the autoencoder AE may be multi-dimensional data resulting from measurement performed by the flow cytometer 10 or the like immediately before. Alternatively, the multi-dimensional data used to optimize the autoencoder AE may be past multi-dimensional data measured by the flow cytometer 10 or the like in advance.

The learning model storage section 130 stores a learning model generated by the learning section 120. Specifically, the learning model storage section 130 stores, as a learning model, the network structure and the weighting of the neural network after learning. The learning model storage section 130 may include, for example, a magnetic storage device such as an HDD (Hard Disk Drive), a semiconductor storage device, an optical storage device, a magneto-optical storage device, or the like.

The learning section 120 and the learning model storage section 130 may be provided in a server or the cloud outside the information processing apparatus 100. For example, the information processing apparatus 100 may generate a learning model by the learning section 120 in the server or the cloud by transmitting multi-dimensional data to the server or the cloud through a network and store the learning model by the learning model storage section 130 in the server or the cloud. In such a case, the dimension compression section 140 described below is able to perform dimension compression on the multi-dimensional data by referring to the learning model stored in the learning model storage section 130 in the server or the cloud through the network.

The dimension compression section 140 generates dimension-compressed data by performing dimension compression on the multi-dimensional data inputted to the input section 110 with a learning model generated by the learning section 120. Specifically, the dimension compression section 140 outputs, as dimension-compressed data of the multi-dimensional data, the values of the respective nodes of the intermediate layer HL obtained in a case where the multi-dimensional data is inputted to the respective nodes of the input layer IL of the autoencoder AE that is a learning model. This allows the dimension compression section 140 to generate dimension-compressed data that includes the features of the multi-dimensional data and has a reduced number of dimensions as compared with the number of dimensions of the multi-dimensional data. For example, the dimension compression section 140 may generate two-dimensional or three-dimensional dimension-compressed data, which is easy for a user to visually recognize.

The output section 150 may be a device that is able to present dimension-compressed data to a user. The output section 150 may be, for example, a display device such as LCD (Liquid Crystal Display), PDP (Plasma Display Panel), an OLED (Organic Light Emitting Diode) display, a hologram, or a projector. Alternatively, the output section 150 may be a printing device such as a printer device. The output section 150 is able to output dimension-compressed data as a scatter diagram plotted on two-dimensional coordinates or three-dimensional coordinates.

Alternatively, the output section 150 may be an external output port that outputs dimension-compressed data to an external apparatus which is able to present the dimension-compressed data to a user. The output section 150 may be a coupling port such as a USB port, an IEEE 1394 port, or an SCSI port that allows, for example, multi-dimension-compressed data to be transmitted to the outside. The output section 150 is able to present dimension-compressed data to a user with a display device or a printing device by outputting the dimension-compressed data to the display device or the printing device.

The information processing apparatus 100 having the configuration described above makes it possible to subject multi-dimensional data to dimension compression into three-dimensional data or lower-dimensional data, which is easy for a user to visually recognize. The multi-dimensional data is obtained by the flow cytometer 10 or the like. The multi-dimensional data includes the fluorescence intensity or the scattered light intensity of biologically derived particles (e.g., cells). In addition, in dimension compression by the information processing apparatus 100, no stochastic process is performed. A result of the dimension compression has high reproducibility. This makes it possible to compare results of dimension compression on a plurality of pieces of multi-dimensional data. According to this, the information processing apparatus 100 allows a user to analyze a result of measurement by the flow cytometer 10 or the like more easily.

(1.3. Operation Example of Information Processing Apparatus)

Next, an operation example of the information processing apparatus 100 according to the present embodiment is described with reference to FIG. 4. FIG. 4 is a flowchart diagram illustrating an example of an operation flow of the information processing apparatus 100 according to the present embodiment.

As illustrated in FIG. 4, first, the input section 110 acquires multi-dimensional data (S101). The acquired multi-dimensional data may be multi-dimensional data measured by the flow cytometer 10 or the like immediately before. Alternatively, the acquired multi-dimensional data may be multi-dimensional data acquired by the flow cytometer 10 or the like in the past.

Next, the autoencoder AE performs learning in the learning section 120 by using the acquired multi-dimensional data (S102). The autoencoder AE includes, for example, a neural network in which the input layer IL and the output layer OL have the same number of nodes as the number of dimensions of the multi-dimensional data and the intermediate layer HL has three or fewer nodes. After sufficient learning, the learned learning model (i.e., the network structure and the weighting of the autoencoder) of the autoencoder is stored in the learning model storage section 130 (S103).

After that, the dimension compression section 140 subjects the multi-dimensional data to dimension compression, for example, into three-dimensional data or lower-dimensional data by using the learned learning model of the autoencoder (S104). Subsequently, the dimension-compressed data obtained by performing dimension compression on the multi-dimensional data is outputted to the outside of the information processing apparatus 100 through the output section 150 (S105). This allows a user to confirm the multi-dimensional data that has been subjected to dimension compression into three-dimensional data or lower-dimensional data, which is easy to visually recognize.

(1.4. Working Example of Dimension Compression)

Subsequently, a working example of dimension compression by the information processing apparatus 100 according to the present embodiment is described with reference to FIGS. 5 and 6.

First, eight-dimensional multi-dimensional data was generated by using a simulator. The eight-dimensional multi-dimensional data simulated a result of measurement by the flow cytometer 10. Specifically, eight-dimensional multi-dimensional data was generated that simulated a result obtained by measuring a cell group of 9000 in total by the flow cytometer 10. The cell group included 8000 cells simple-stained with eight different fluorescent dyes by the thousand and 1000 cells unstained. A portion of the generated eight-dimensional multi-dimensional data is exemplified in Table 1 below. It is to be noted that Ch1 to Ch8 indicate outputs from the respective light receivers of the light receiver array included in the photodetector 14.

TABLE 1

| cell number | Ch1 | Ch2 | ... | Ch8 |
|---|---|---|---|---|
| 1 | 1 | 20 | ... | 20 |
| 2 | 1 | 2 | ... | 10 |
| 3 | 0 | 100 | ... | 0 |
| . | . | . | . | . |
| . | . | . | . | . |
| . | . | . | . | . |
| 9000 | 2 | 10 | ... | 100 |

Next, a learning model was generated by applying the eight-dimensional multi-dimensional data generated by the simulator to the autoencoder AE in which the input layer IL and the output layer OL each had eight nodes and the one intermediate layer HL provided between the input layer IL and the output layer OL had two nodes. Specifically, the network structure and the weighting of the autoencoder AE were optimized to minimize the difference between the multi-dimensional data inputted to the input layer IL and the multi-dimensional data outputted from the output layer OL. This made it possible to generate the learning model of the autoencoder AE in which the network structure and the weighting were optimized. It is to be noted that the learning time for generating the learning model was 439.2 seconds.

It is to be noted that the eight-dimensional multi-dimensional data which simulates a result of measurement by the flow cytometer 10 has been used above. However, in a case where higher-dimensional multi-dimensional data is used, it is sufficient if the input layer IL and the output layer OL each have a larger number of nodes in accordance with the number of dimensions of the multi-dimensional data.

Subsequently, the eight-dimensional multi-dimensional data described above was inputted to the input layer IL again in the generated learning model to cause the two-dimensional data of the intermediate layer HL to be outputted. FIG. 5 illustrates a result obtained by plotting the two-dimensional data outputted from the intermediate layer HL on the vertical axis and the horizontal axis. In other words, FIG. 5 is a graphical chart illustrating a result of dimension compression by the information processing apparatus 100 according to the present embodiment.

In addition, FIG. 6 illustrates a result obtained by plotting two-dimensional data on the vertical axis and the horizontal axis. The two-dimensional data is obtained by performing dimension compression on the same eight-dimensional multi-dimensional data by t-SNE. In other words, FIG. 6 is a graphical chart illustrating a result of dimension compression according to a comparative example.

As illustrated in FIGS. 5 and 6, dimension compression by the information processing apparatus 100 according to the present embodiment offers favorable group cohesion (intra-cluster binding) and favorable distance between a group and another group (inter-cluster separation) as compared with dimension compression by t-SNE. This indicates that a favorable result is obtained as clustering.

Specifically, in a case where the degree to which clustering was favorable was expressed as an index (a smaller numerical value indicated that clustering was more favorable) by using intra-cluster dispersiveness indicating the intra-cluster binding and inter-cluster distance indicating the inter-cluster separation, a result of dimension compression by the information processing apparatus 100 according to the present embodiment (FIG. 5) exhibited an index of 0.13. In contrast, a result of the dimension compression by t-SNE (FIG. 6) exhibited an index of 1.13. This indicates that the information processing apparatus 100 according to the present embodiment allows multi-dimensional data to be subjected to dimension compression with higher accuracy.

In addition, while dimension compression by t-SNE had a processing time of 53.5 seconds, dimension compression by the information processing apparatus 100 according to the present embodiment had a processing time of 0.64 seconds. In the information processing apparatus 100 according to the present embodiment, a learning model for dimension compression is generated in advance. This makes it possible to considerably reduce the processing time for performing dimension compression on multi-dimensional data.

As described above, the information processing apparatus 100 according to the present embodiment is able to perform dimension compression on multi-dimensional data more rapidly with higher accuracy by generating a learning model in advance and performing dimension compression on the multi-dimensional data by using the generated learning model without performing a stochastic process.

2. Second Embodiment (2.1. Configuration Example of Information Processing Apparatus)

Next, an information processing apparatus according to a second embodiment of the present disclosure is described with reference to FIG. 7. FIG. 7 is a block diagram illustrating a functional configuration of an information processing apparatus 101 according to the present embodiment. The information processing apparatus according to the present embodiment is able to perform dimension compression on even new multi-dimensional data at high speed by using a learning model that has been learned in the information processing apparatus 100 according to the first embodiment. Here, the flow cytometer system includes the flow cytometer 10 and the information processing apparatus 101.

As illustrated in FIG. 7, the information processing apparatus 101 includes, for example, the input section 110, the learning model storage section 130, the dimension compression section 140, and the output section 150. The information processing apparatus 101 according to the present embodiment does not include the learning section 120, but is able to perform dimension compression on even new multi-dimensional data at high speed by using a learning model that has already been learned.

The input section 110, the dimension compression section 140, and the output section 150 are substantially similar to the components described for the information processing apparatus 100 according to the first embodiment and are not thus described here.

The learning model storage section 130 stores a learning model for performing dimension compression on multi-dimensional data. Specifically, the learning model storage section 130 stores, as a learning model, the autoencoder AE in which a neural network is used that includes the input layer IL, the at least one or more intermediate layers HL, and the output layer OL as in the first embodiment. The at least one or more intermediate layers HL each have a smaller number of nodes than the number of nodes of the input layer IL. The output layer OL has the same number of nodes as the number of nodes of the input layer IL. The autoencoder AE stored in the learning model storage section 130 as a learning model performs learning, for example, in the information processing apparatus 100 or the like according to the first embodiment. The network structure and the weighting thereof have been optimized. This allows the subsequent dimension compression section 140 to perform dimension compression on multi-dimensional data acquired by the input section 110 as with the information processing apparatus 100 according to the first embodiment.

It is to be noted that the learning model storage section 130 may be provided in a server or the cloud outside the information processing apparatus 101. For example, the information processing apparatus 101 may perform dimension compression on the multi-dimensional data by referring to the learning model stored in the learning model storage section 130 in the server or the cloud through the network.

The information processing apparatus 101 having the configuration described above makes it possible to analyze a result of measurement by the flow cytometer 10 or the like in a shorter time by using a learning model that has already been learned.

(2.2. Operation Example of Information Processing Apparatus)

Subsequently, an operation example of the information processing apparatus 101 according to the present embodiment is described with reference to FIG. 8. FIG. 8 is a flowchart diagram illustrating an example of an operation flow of the information processing apparatus 101 according to the present embodiment.

As illustrated in FIG. 8, first, the input section 110 acquires measurement data from the flow cytometer (FCM) 10 (S201). The measurement data is, for example, multi-dimensional data including data regarding fluorescence intensity and scattered light intensity measured by the photodetector 14 of the flow cytometer 10. Next, the dimension compression section 140 subjects the measurement data to dimension compression, for example, into three-dimensional data or lower-dimensional data by using a learning model stored in the learning model storage section 130 (S202). The dimension-compressed data obtained by performing dimension compression on the measurement data is outputted to the outside of the information processing apparatus 101 through the output section 150 (S203). This allows a user to confirm the measurement data subjected to dimension compression into three-dimensional data or lower-dimensional data, which is easy to visually recognize, and analyze a result of measurement by the flow cytometer 10 or the like.

(2.3. Working Example of Dimension Compression)

Subsequently, a working example of dimension compression by the information processing apparatus 101 according to the present embodiment is described with reference to FIGS. 9 and 10.

First, eight-dimensional multi-dimensional data was generated by using a simulator. The eight-dimensional multi-dimensional data simulated a result obtained by the flow cytometer 10 measuring a cell group of 11000 in total. The cell group of 11000 was obtained by further adding 1000 cells stained with a plurality of fluorescent dyes and 1000 cells simple-stained at a low concentration to the cell group of 9000 in total described in (1.4. Working Example of Dimension Compression) above.

Next, the eight-dimensional multi-dimensional data described above was inputted to the input layer IL to cause the data of the intermediate layer HL to be outputted by using the learning model generated in (1.4. Working Example of Dimension Compression) above. The right portion of FIG. 9 illustrates a result obtained by plotting the two-dimensional data outputted from the intermediate layer HL on the vertical axis and the horizontal axis. For reference, the left portion of FIG. 9 illustrates dimension-compressed data of the cell group of 9000 demonstrated in (1.4. Working Example of Dimension Compression) above with reference to FIG. 5.

In addition, the right portion of FIG. 10 illustrates a result obtained by plotting two-dimensional data on the vertical axis and the horizontal axis. The two-dimensional data is obtained by performing dimension compression on the same eight-dimensional multi-dimensional data by t-SNE. For reference, the left portion of FIG. 10 illustrates dimension-compressed data of the cell group of 9000 demonstrated in (1.4. Working Example of Dimension Compression) above with reference to FIG. 6.

As illustrated in FIGS. 9 and 10, it is possible in dimension compression by the information processing apparatus 100 according to the present embodiment to cluster the two added cell groups of 1000 as unknown clusters UC1 and UC2 as with dimension compression by t-SNE.

As a result of dimension compression by t-SNE (FIG. 10), the disposition and the shapes of the clusters, however, change whenever dimension compression is performed because of low dimension compression reproducibility. In addition, in a case where actual measurement data is subjected to dimension compression, the cell groups are not labelled unlike a simulation. It is thus difficult in a result of dimension compression by t-SNE to determine from the shapes and the disposition of the clusters which clusters the two added cell groups of 1000 correspond to.

In contrast, dimension compression by the information processing apparatus 101 according to the present embodiment has high dimension compression reproducibility. The disposition and the shapes of the clusters thus have almost no changes. Dimension compression by the information processing apparatus 101 according to the present embodiment thus makes it possible to easily determine which clusters the two added cell groups of 1000 correspond to on the basis of the shapes and the disposition of the clusters.

As described above, the information processing apparatus 101 according to the present embodiment is able to perform dimension compression on multi-dimensional data more rapidly by performing dimension compression on the multi-dimensional data by using a learning model generated in advance without performing a stochastic process. In addition, the information processing apparatus 101 according to the present embodiment has high dimension compression reproducibility, making it possible to discover an unknown cluster more easily at higher speed.

Such a comparison between pieces of measurement data is usable, for example, for a comparison between a sample (e.g., blood or the like) taken from a patient and a sample taken from a healthy person. This makes it possible to easily identify a cell group that is expressed in a patient-specific manner. In addition, a comparison between pieces of measurement data is usable for a comparison between samples taken from the same patient at different dates, a comparison between measurement data of a sample actually taken from a patient and model data, or the like. Further, a comparison between pieces of measurement data is usable for a comparison between cell samples cultured under different conditions. This makes it possible to easily detect the presence of different medicines or a change in a cell sample brought about by the presence or absence of medicine. It is thus possible to easily determine the effectiveness of medicine on a cell sample.

3. Third Embodiment (3.1. Configuration Example of Sorting System)

Subsequently, a sorting system according to a third embodiment of the present disclosure is described with reference to FIG. 11. FIG. 11 is a block diagram illustrating a functional configuration of a sorting system according to the present embodiment. The sorting system according to the present embodiment is able to rapidly sort a specific group in the measurement targets S by using dimension compression with a learning model described for the information processing apparatus 100 according to the first embodiment. For example, the sorting system according to the present embodiment is a so-called cell sorter that is able to sort a specific group in the measurement targets S.

As illustrated in FIG. 11, a sorting system 20 includes an information processing apparatus 102 and a sorting apparatus 200.

The information processing apparatus 102 includes the input section 110, the learning section 120, the learning model storage section 130, the dimension compression section 140, the output section 150, and a group identification section 160.

The input section 110, the learning section 120, the learning model storage section 130, the dimension compression section 140, and the output section 150 are substantially similar to the components described for the information processing apparatus 100 according to the first embodiment and are not thus described here.

A result of dimension compression on multi-dimensional data outputted from the output section 150 is visually recognized by a user as, for example, a two-dimensional or three-dimensional graph. The result of the dimension compression allows the user to confirm the number of a plurality of groups (clusters) included in the measurement targets S, the intra-cluster dispersiveness, and the distance between clusters.

The group identification section 160 identifies a group of measurement targets S to be sorted by the sorting apparatus 200 on the basis of the designation from a user. For example, the group identification section 160 identifies a group of measurement targets S serving as a sorting target on the basis of a group or an area designated by a user on a two-dimensional or three-dimensional graph resulting from dimension compression.

The sorting apparatus 200 includes an input section 210, a dimension compression section 240, a sorting control section 270, and a sorting section 280. Further, as with a flow cytometer 100, the sorting apparatus 200 includes the laser light source 11, the flow cell 12, the detection optical section 13, and the photodetector 14. The sorting apparatus 200 is able to determine in real time whether or not the measurement targets S are sorting targets on the basis of measurement data of the measurement targets S. The sorting apparatus 200 is able to separate a group of measurement targets S serving as a sorting target from the other groups and acquire the group.

The input section 210 acquires measurement data of the measurement targets S from the photodetector 14 or the like. Specifically, the input section 210 acquires measurement data of the respective particles of the measurement targets S as multi-dimensional data. For example, the input section 210 may acquire, as multi-dimensional data, measurement data regarding the fluorescence intensity or the scattered light intensity of the respective wavelength ranges of the particles of the measurement targets S.

The dimension compression section 240 performs dimension compression on measurement data of the measurement targets S inputted to the input section 210 by using a learning model stored in the learning model storage section 130. In the sorting system 20 according to the present embodiment, the dimension compression section 240 performs dimension compression by using the same learning model as the learning model of the dimension compression section 140 of the information processing apparatus 102. This allows the sorting apparatus 200 to obtain a result of dimension compression similar to a result of dimension compression by the information processing apparatus 102. The learning model stored in the learning model storage section 130 may be a learning model learned by using the measurement targets S including a group to be sorted. Alternatively, the learning model stored in the learning model storage section 130 may be a learning model learned in advance by using another sample or the like.

On the basis of a result of dimension compression by the dimension compression section 240 on measurement data, the sorting control section 270 determines whether or not the measurement targets S from which measurement data is acquired are sorting targets. The sorting control section 270 controls the sorting section 280 to cause the sorting section 280 to sort the measurement targets S determined as sorting targets. Specifically, the sorting control section 270 may determine whether or not a result of dimension compression by the dimension compression section 240 on measurement data included in a group or an area designated on the basis of a result of dimension compression by the dimension compression section 140, thereby determining whether or not the measurement targets S are sorting targets.

The sorting section 280 distinguishes the measurement targets S determined by the sorting control section 270 as sorting targets from the other measurement targets S. Specifically, the sorting section 280 charges a droplet including the measurement targets S determined as sorting targets and causes the droplet to pass between a pair of deflection plates to which a voltage is applied. This allows the sorting section 280 to separate the droplet including the measurement targets S determined as sorting targets from a droplet including the other measurement targets S by using electrostatic attraction force. The droplet including the separated measurement targets S is collected, for example, in a well or a tube for sorting.

The sorting system 20 according to the present embodiment performs dimension compression by using the autoencoder AE having high dimension compression reproducibility. This allows the dimension compression section 140 of the information processing apparatus 102 and the dimension compression section 240 of the sorting apparatus 200 to offer similar results of dimension compression. This allows the sorting control section 270 to determine from a result of dimension compression by the dimension compression section 240 whether or not the measurement targets S are sorting targets designated on the basis of a result of dimension compression by the dimension compression section 140.

In addition, in the sorting system 20 according to the present embodiment, the dimension compression section 140 and the dimension compression section 240 each perform dimension compression by using a learning model that has already been learned, making it possible to rapidly obtain a result of the dimension compression in a short time. This allows the sorting system 20 according to the present embodiment to rapidly perform dimension compression on measurement data and determine whether or not the measurement targets S are sorting targets in spite of time constraints from a measurement process to a sorting process.

The sorting system 20 having the configuration described above makes it possible to perform dimension compression more rapidly with higher accuracy by using a learned learning model having high dimension compression reproducibility. This makes it possible to sort, with high accuracy, the measurement targets S serving as sorting targets designated from a result of the dimension compression.

(3.2. Operation Example of Sorting System)

Next, an operation example of the sorting system 20 according to the present embodiment is described with reference to FIG. 12. FIG. 12 is a flowchart diagram illustrating an example of an operation flow of the sorting system 20 according to the present embodiment.

As illustrated in FIG. 12, first, the input section 110 acquires measurement data from the flow cytometer (FCM) 10 (S301). The measurement data is, for example, multi-dimensional data including data regarding fluorescence intensity and scattered light intensity measured by the photodetector 14 of the flow cytometer 10. Next, the dimension compression section 140 subjects the measurement data to dimension compression, for example, into three-dimensional data or lower-dimensional data by using a learning model stored in the learning model storage section 130 (S302). The dimension-compressed data obtained by performing dimension compression on the measurement data is outputted to the outside of the information processing apparatus 102 through the output section 150. In this way, a user identifies a group serving as a sorting target on the basis of the outputted dimension-compressed data (S303). Information regarding the group identified by the user and serving as a sorting target is inputted to the group identification section 160.

After that, the measurement targets S from which the measurement data is acquired in S301 are measured again, thereby inputting the measurement data of the measurement targets S to the input section 210 (S304). Next, the dimension compression section 240 subjects the measurement data to dimension compression, for example, into three-dimensional data or lower-dimensional data in real time by using a learning model stored in the learning model storage section 130 (S305).

Here, the sorting control section 270 determines whether or not the measurement targets S from which the measurement data is acquired are the sorting targets identified in S303 on the basis of a result of the dimension compression on the measurement data (S306). In a case where it is determined that the measurement targets S from which the measurement data is acquired are sorting targets (S306/Yes), the sorting control section 270 controls the sorting section 280 to cause the sorting section 280 to sort the measurement targets S (S307). In contrast, in a case where it is determined that the measurement targets S from which the measurement data is acquired are not sorting targets (S306/No), the sorting section 280 does not sort the measurement targets S, but the measurement targets S are collected in a waste liquid tank or the like. This allows the sorting system 20 according to the present embodiment to sort, with high accuracy, the sorting targets designated from a result of the dimension compression on the measurement data.

4. Modification Example

In each of the embodiments described above, the multi-dimensional data is used as measurement data of the flow cytometer 10, but the technology according to the present disclosure is not limited to the example described above. The technology according to the present disclosure is applicable, for example, to a fluorescent light imaging apparatus that measures multi-dimensional data such as the spectra of pieces of fluorescent light by using an imaging element (two-dimensional image sensor). In other words, the information processing apparatus described in each of the embodiments described above is also able to perform dimension compression on multi-dimensional data measured by the fluorescent light imaging apparatus.

FIG. 13 illustrates a schematic configuration example of a fluorescent light imaging apparatus. FIG. 13 is a schematic diagram illustrating a schematic configuration of the fluorescent light imaging apparatus.

As illustrated in FIG. 13, a fluorescent light imaging apparatus 30 includes, for example, a laser light source 31, a movable stage 32, a light dispersion section 34, and an imaging element 35.

The laser light source 31 emits, for example, laser light having a wavelength that is able to excite fluorescent dyes used to stain a fluorescent staining sample 33. In a case where a plurality of fluorescent dyes is used to stain the fluorescent staining sample 33, the plurality of laser light sources 31 may be provided in accordance with the excitation wavelengths of the plurality of respective fluorescent dyes. For example, the laser light source 31 may be a semiconductor laser light source. The laser light emitted from the laser light source 31 may be pulse light or continuous light.

The movable stage 32 is a stage on which the fluorescent staining sample 33 is placed. The movable stage 32 is horizontally movable to cause laser light emitted from the laser light source 31 to scan the fluorescent staining sample 33 in a two-dimensional manner.

The fluorescent staining sample 33 is a specimen taken from a human body or a sample prepared from a tissue sample and stained with a plurality of fluorescent dyes, for example, for the purpose of pathology diagnosis or the like. The fluorescent staining sample 33 includes a large number of measurement targets S such as cells included in collected tissue. It is possible to sequentially irradiate a large number of measurement targets S included in the fluorescent staining sample 33 with laser light emitted from the laser light source 31 by horizontally moving the fluorescent staining sample 33 with the movable stage 32.

The light dispersion section 34 is an optical element that disperses pieces of fluorescent light emitted from the measurement targets S irradiated with laser light into spectra of continuous wavelengths. The light dispersion section 34 may be, for example, a prism, a grating, or the like. In addition, alternatively, the light dispersion section 34 may be an optical element that disperses pieces of fluorescent light emitted from the measurement targets S irradiated with laser light for each of the predetermined detection wavelength ranges. In such a case, the light dispersion section 34 includes, for example, at least one or more dichroic mirrors or optical filters. The light dispersion section 34 is able to disperse pieces of fluorescent light from the measurement targets S into pieces of light in a predetermined detection wavelength range by using optical members such as dichroic mirrors and optical filters. The pieces of light in the predetermined detection wavelength ranges dispersed by the light dispersion section 34 may be thus detected by the subsequent imaging element 35.

The imaging element 35 is a two-dimensional image sensor in which light receivers such as CCD (Charge Coupled Device) sensors, CMOS (Complementary Metal-Oxide-Semiconductor) sensors, or the like are two-dimensionally disposed.

The imaging element 35 outputs an image signal by receiving, with the respective two-dimensionally disposed light receivers, the pieces of fluorescent light emitted from the measurement targets S included in the fluorescent staining sample 33 and then dispersed by the light dispersion section 34. The pieces of fluorescent light emitted from the measurement targets S irradiated with laser light are dispersed by the light dispersion section 34. This allows the imaging element 35 to receive pieces of fluorescent light in wavelength ranges different between regions and output an image signal corresponding to the received fluorescence intensity.

In the fluorescent light imaging apparatus 30 having the configuration described above detects, the pieces of fluorescent light emitted from the measurement targets S included in the fluorescent staining sample 33 are dispersed by the light dispersion section 34 and then detected by the respective light receivers of the imaging element 35. An image signal outputted from the imaging element 35 is thus multi-dimensional data. This makes it possible to perform dimension compression by the information processing apparatus described in each of the embodiments described above as with measurement data of the flow cytometer 10 described above.

Multi-dimensional data subjected to dimension compression by the information processing apparatus according to each of the embodiments described above may an image signal associated with positional information acquired by the imaging element 35. In addition, in a case where an image of the fluorescent staining sample 33 is subjected to a segmentation process, the multi-dimensional data subjected to dimension compression by the information processing apparatus may be image data associated with a region obtained through the segmentation process.

It is to be noted that the technology according to the present disclosure is not limited to the fluorescent light imaging apparatus that acquires fluorescent light information, but applicable to a general microscope apparatus that acquires an image of a biological sample by using an imaging element. For example, in a case where a biological sample including a plurality of sections has the respective sections subjected to staining processes such as HE (Hematoxylin Eosin) staining or immunohistochemistry to acquire images of the respective sections subjected to the staining processes, it is possible to use, as multi-dimensional data, image data acquired from the plurality of images in association with positional information regarding positions on the biological sample. In addition, in a case where a plurality of images of the biological sample is subjected to segmentation processes, it is also possible to use, as multi-dimensional data, image data associated with regions obtained through the segmentation processes.

5. Hardware Configuration Example

Further, a hardware configuration of any of the information processing apparatuses 100, 101, and 102 according to the present embodiment is described with reference to FIG. 14. FIG. 14 is a block diagram illustrating a hardware configuration example of any of the information processing apparatuses 100, 101, and 102 according to the present embodiment.

The functions of the information processing apparatuses 100, 101, and 102 according to the present embodiment are achieved by cooperation between software and hardware described below. For example, the functions of the learning section 120, the dimension compression section 140, and the group identification section 160 described above may be executed by CPU 901.

As illustrated in FIG. 14, each of the information processing apparatuses 100, 101, and 102 includes the CPU (Central Processing Unit) 901, ROM (Read Only Memory) 903, and RAM (Random Access Memory) 905.

In addition, each of the information processing apparatuses 100, 101, and 102 may further include a host bus 907, a bridge 909, an external bus 911, an interface 913, an input device 915, an output device 917, a storage device 919, a drive 921, a coupling port 923, and a communication device 925. Further, each of the information processing apparatuses 100, 101, and 102 may include another processing circuit such as DSP (Digital Signal Processor) or ASIC (Application Specific Integrated Circuit) in place of the CPU 901 or in addition to the CPU 901.

The CPU 901 functions as an arithmetic processing device or a control device. The CPU 901 controls the overall operation of any of the information processing apparatuses 100, 101, and 102 in accordance with a variety of programs recorded in the ROM 903, the RAM 905, the storage device 919, or a removable recording medium 927. The ROM 903 stores a program, an arithmetic parameter, and the like to be used by the CPU 901. The RAM 905 temporarily stores a program to be used in execution by the CPU 901, a parameter to be used in the execution thereof, and the like.

The CPU 901, the ROM 903, and the RAM 905 are coupled to each other by the host bus 907 including an internal bus such as a CPU bus. Further, the host bus 907 is coupled to the external bus 911 such as a PCI (Peripheral Component Interconnect/Interface) bus through the bridge 909.

The input device 915 is, for example, a device such as a mouse, a keyboard, a touch panel, a button, a switch, or a lever that receives an input from a user. The input device 915 may also be a microphone or the like that detects a sound of a user. In addition, the input device 915 may be, for example, a remote control device that uses an infrared ray or other radio waves. The input device 915 may also be an external coupling apparatus 929 that corresponds to an operation on any of the information processing apparatuses 100, 101, and 102.

The input device 915 further includes an input control circuit that outputs, to the CPU 901, an input signal generated on the basis of information inputted by a user. The user is able to input various kinds of data to any of the information processing apparatuses 100, 101, and 102 or instruct any of the information processing apparatuses 100, 101, and 102 about a process operation by operating the input device 915.

The output device 917 is a device that is able to visually or aurally present information acquired or generated by any of the information processing apparatuses 100, 101, and 102 to a user. The output device 917 may be, for example, a display device such as LCD (Liquid Crystal Display), PDP (Plasma Display Panel), an OLED (Organic Light Emitting Diode) display, a hologram, or a projector. In addition, the output device 917 may be a sound output device such as a speaker or a headphone. The output device 917 may also be a printing device such as a printer device. The output device 917 may output information obtained through a process of any of the information processing apparatuses 100, 101, and 102 as an image such as text or a picture or a sound such as a voice or an acoustic sound. The output device 917 may function, for example, as the output section 150 described above.

The storage device 919 is a data storage device configured as an example of a storage section of any of the information processing apparatuses 100, 101, and 102. The storage device 919 may include, for example, a magnetic storage device such as an HDD (Hard Disk Drive), a semiconductor storage device, an optical storage device, a magneto-optical storage device, or the like. The storage device 919 is able to store a program to be executed by the CPU 901, various kinds of data, various kinds of data obtained from the outside, or the like. For example, the storage device 919 may function as the learning model storage section 130 described above.

The drive 921 is a reading or writing device for the removable recording medium 927 such as a magnetic disk, an optical disc, a magneto-optical disk, or a semiconductor memory. The drive 921 is built in or externally attached to any of the information processing apparatuses 100, 101, and 102. For example, the drive 921 is able to read out information recorded in the mounted removable recording medium 927 and output the information to the RAM 905. In addition, the drive 921 is able to write a record in the mounted removable recording medium 927.

The coupling port 923 is a port for directly coupling the external coupling apparatus 929 to any of the information processing apparatuses 100, 101, and 102. The coupling port 923 may be, for example, a USB (Universal Serial Bus) port, an IEEE 1394 port, an SCSI (Small Computer System Interface) port, or the like. In addition, the coupling port 923 may be an RS-232C port, an optical audio terminal, an HDMI (registered trademark) (High-Definition Multimedia Interface) port, or the like. The coupling port 923 allows various kinds of data to be transmitted and received between any of the information processing apparatuses 100, 101, and 102 and the external coupling apparatus 929 by being coupled to the external coupling apparatus 929. The coupling port 923 may function, for example, as the input section 110 or the output section 150 described above.

The communication device 925 is, for example, a communication interface including a communication device and the like for coupling to a communication network 931. The communication device 925 may be, for example, a communication card or the like for wired or wireless LAN (Local Area Network), Bluetooth (registered trademark), or WUSB (Wireless USB). In addition, the communication device 925 may be a router for optical communication, a router for ADSL (Asymmetric Digital Subscriber Line), a modem for various kinds of communication, or the like. The communication device 925 may function, for example, as the input section 110 or the output section 150 described above.

For example, the communication device 925 is able to transmit and receive signals or the like through the Internet or communication with another communication apparatus by using a predetermined protocol such as TCP/IP. The communication network 931 coupled to the communication device 925 may be a network coupled in a wired or wireless manner. The communication network 931 may be, for example, an Internet communication network, home LAN, an infrared communication network, a radio wave communication network, a satellite communication network, or the like.

It is to be noted that it is also possible to create a program for causing the hardware built in the computer such as the CPU 901, the ROM 903, and the RAM 905 to exhibit functions equivalent to those of any of the information processing apparatuses 100, 101, and 102 described above. In addition, it is also possible to provide a computer-readable recording medium having the program recorded thereon.

Further, not all of the components and operations described in the respective embodiments are necessary as the components and operations according to the present disclosure. For example, among the components according to the respective embodiments, a component that is not described in an independent claim reciting the most generic concept of the present disclosure should be understood as an optional component.

The terms used throughout this specification and the appended claims should be construed as "non-limiting" terms. For example, the term "including" or "included" should be construed as "not limited to what is described as being included". The term "having" should be construed as "not limited to what is described as having".

The terms used in this specification are used merely for the convenience of description and include terms that are not used to limit the configuration and the operation. For example, the terms such as "right", "left", "up", and "down" only indicate directions in the diagrams being referred to. In addition, the terms "inside" and "outside" only indicate a direction toward the center of a component of interest and a direction away from the center of a component of interest, respectively. The same applies to terms similar to these and terms with the similar purpose.

It is to be noted that the technology according to the present disclosure may have configurations as follows. The technology according to the present disclosure having the following configurations performs dimension compression on multi-dimensional data serving as input data by using a learning model that has already been learned in a dimension compression method in which no stochastic process is performed. This allows the information processing apparatus to perform dimension compression on the multi-dimensional data at higher speed with higher reproducibility, making it possible to analyze the multi-dimensional data more easily. Effects attained by the technology according to the present disclosure are not necessarily limited to the effects described herein, but may include any of the effects described in the present disclosure.

(1)

An information processing apparatus including
a dimension compression section that generates dimension-compressed data for input data on the basis of a learning model generated by a neural network in which same data acquired from a biologically derived substance is applied to an input layer and an output layer.

(2)

The information processing apparatus according to (1), in which the learning model includes a network structure and weighting of the neural network including the input layer, at least one or more intermediate layers, and the output layer, the at least one or more intermediate layers each having a smaller number of nodes than a number of nodes of the input layer, the output layer having a same number of nodes as the number of nodes of the input layer.

(3)

The information processing apparatus according to (2), in which the learning model includes an autoencoder.

(4)

The information processing apparatus according to (3), in which the learning model performs no stochastic process.

(5)

The information processing apparatus according to any one of (2) to (4), in which the dimension-compressed data includes output data from the respective nodes of the intermediate layers.

(6)

The information processing apparatus according to any one of (1) to (5), in which the dimension-compressed data includes data subjected to dimension compression into three-dimensional data or lower-dimensional data.

(7)

The information processing apparatus according to any one of (1) to (6), in which the input data includes multi-dimensional data acquired from the biologically derived substance.

(8)

The information processing apparatus according to (7), in which the input data includes data that is same as data used to generate the learning model.

(9)

The information processing apparatus according to (7), in which the input data includes data that is different from data used to generate the learning model.

(10)

The information processing apparatus according to any one of (7) to (9), in which the input data includes multi-dimensional data acquired from a biologically derived particle, the multi-dimensional data including fluorescence intensity or scattered light intensity.

(11)

The information processing apparatus according to (10), further including a sorting control section that controls a sorting section, the sorting section sorting, on the basis of the dimension-compressed data, the biologically derived particle from which the input data is acquired.

(12)

The information processing apparatus according to any one of (1) to (11), further including a learning section that generates the learning model.

(13)

An information processing apparatus including a learning section that generates a learning model by using a neural network in which same multi-dimensional data acquired from a biologically derived substance is applied to an input layer and an output layer.

(14)

A sorting system including:
 a dimension compression section that generates dimension-compressed data for input data on the basis of a learning model generated by a neural network in which same data acquired from a biologically derived substance is applied to an input layer and an output layer; and
 a sorting control section that controls a sorting section, the sorting section sorting, on the basis of the dimension-compressed data, a biologically derived particle from which the input data is acquired.

(15)

An information processing method including
 generating, by an arithmetic processing device, dimension-compressed data for input data on the basis of a learning model generated by a neural network in which same data acquired from a biologically derived substance is applied to an input layer and an output layer.

(16)

A program causing a computer to function as
 a dimension compression section that generates dimension-compressed data for input data on the basis of a learning model generated by a neural network in which same data acquired from a biologically derived substance is applied to an input layer and an output layer.

(17)

A flow cytometer system including:
 a laser light source that irradiates a biologically derived particle with light, the biologically derived particle flowing in a flow path;
 a photodetector that detects light from the biologically derived particle; and
 a dimension compression section that generates dimension-compressed data for measurement data on the basis of a learning model, the measurement data being obtained by the photodetector, in which the learning model is generated by a neural network in which same data acquired from a biologically derived substance is applied to an input layer and an output layer.

(18)

The flow cytometer system according to (17), in which the biologically derived substance includes a particle that is labeled with a same fluorescent dye as a fluorescent dye of the biologically derived particle.

(19)

The flow cytometer system according to (17) or (18), in which the learning model includes a network structure and weighting of the neural network including the input layer, at least one or more intermediate layers, and the output layer, the at least one or more intermediate layers each having a smaller number of nodes than a number of nodes of the input layer, the output layer having a same number of nodes as the number of nodes of the input layer.

(20)

The flow cytometer system according to (19), in which the learning model includes an autoencoder.

(21)

The flow cytometer system according to (20), in which the learning model performs no stochastic process.

(22)

The flow cytometer system according to any one of (19) to (21), in which the dimension-compressed data includes output data from the respective nodes of the intermediate layers.

(23)

The flow cytometer system according to any one of (17) to (22), in which the dimension-compressed data includes data subjected to dimension compression into three-dimensional data or lower-dimensional data.

(24)

The flow cytometer system according to any one of (17) to (23), in which data used to generate the learning model includes data that is same as the measurement data.

(25)

The flow cytometer system according to any one of (17) to (23), in which data used to generate the learning model includes data that is different from the measurement data.

(26)

The flow cytometer system according to any one of (17) to (23), in which the measurement data includes multi-dimensional data acquired from the biologically derived particle, the multi-dimensional data including fluorescence intensity or scattered light intensity.

(27)
A sorting system including:
a laser light source that irradiates a biologically derived particle with light, the biologically derived particle flowing in a flow path;
a photodetector that detects light from the biologically derived particle;
a dimension compression section that generates dimension-compressed data for measurement data on the basis of a learning model, the measurement data being obtained by the detection section; and
a sorting section that sorts the biologically derived particle on the basis of the dimension-compressed data, in which
the learning model is generated by a neural network in which same data acquired from a biologically derived substance is applied to an input layer and an output layer.

(28)
The sorting system according to (27), in which the biologically derived substance includes a particle that is labeled with a same fluorescent dye as a fluorescent dye of the biologically derived particle.

(29)
The sorting system according to (27) or (28), in which data used to generate the learning data includes multi-dimensional data acquired from the biologically derived particle in advance.

(30)
The sorting system according to any one of (27) to (29), in which the learning model includes a network structure and weighting of the neural network including the input layer, at least one or more intermediate layers, and the output layer, the at least one or more intermediate layers each having a smaller number of nodes than a number of nodes of the input layer, the output layer having a same number of nodes as the number of nodes of the input layer.

(31)
The sorting system according to (30), in which the learning model includes an autoencoder.

(32)
The sorting system according to (31), in which the learning model performs no stochastic process.

(33)
The sorting system according to any one of (30) to (32), in which the dimension-compressed data includes output data from the respective nodes of the intermediate layers.

(34)
The sorting system according to any one of (27) to (33), in which the dimension-compressed data includes data subjected to dimension compression into three-dimensional data or lower-dimensional data.

(35)
The sorting system according to any one of (28) to (34), in which the measurement data includes multi-dimensional data acquired from the biologically derived particle, the multi-dimensional data including fluorescence intensity or scattered light intensity.

This application claims the priority on the basis of Japanese Patent Application No. 2020-136770 filed with Japan Patent Office on Aug. 13, 2020, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. An information processing apparatus comprising:
a dimension compression section that generates dimension-compressed data for input data on a basis of a learning model generated by a neural network in which same data acquired from a biologically derived substance is applied to an input layer and an output layer
wherein the input data includes multi-dimensional data acquired from the biologically derived substance; and
the input data includes data that is same as data used to generate the learning model; and
the input data includes multi-dimensional data acquired from a biologically derived particle, the multi-dimensional data including fluorescence intensity or scattered light intensity;
further comprising a sorting control section that controls a sorting section, the sorting section sorting, on a basis of the dimension-compressed data, the biologically derived particle from which the input data is acquired;
wherein the sorting section charges a droplet, passes the droplet through deflection points to which a voltage is applied, and separates measurement targets using electrostatic attraction force.

2. The information processing apparatus according to claim 1, wherein the learning model includes a network structure and weighting of the neural network including the input layer, at least one or more intermediate layers, and the output layer, the at least one or more intermediate layers each having a smaller number of nodes than a number of nodes of the input layer, the output layer having a same number of nodes as the number of nodes of the input layer.

3. The information processing apparatus according to claim 2, wherein the learning model includes an autoencoder.

4. The information processing apparatus according to claim 3, wherein the learning model performs no stochastic process.

5. The information processing apparatus according to claim 2, wherein the dimension-compressed data includes output data from the respective nodes of the intermediate layers.

6. The information processing apparatus according to claim 1, wherein the dimension-compressed data includes data subjected to dimension compression into three-dimensional data or lower-dimensional data.

7. The information processing apparatus according to claim 1, wherein the input data includes data that is different from data used to generate the learning model.

8. The information processing apparatus according to claim 1, further comprising a learning section that generates the learning model.

9. A flow cytometer system comprising:
a laser light source that irradiates a biologically derived particle with light, the biologically derived particle flowing in a flow path;
a photodetector that detects light from the biologically derived particle; and
a dimension compression section that generates dimension-compressed data for measurement data on a basis of a learning model, the measurement data being obtained by the photodetector, wherein
the learning model is generated by a neural network in which same data acquired from a biologically derived substance is applied to an input layer and an output layer; and
a sorting control section that controls a sorting section, the sorting section sorting, on a basis of the dimension-compressed data, the biologically derived particle from which input data is acquired;

wherein the sorting section charges a droplet, passes the droplet through deflection plates where a voltage is applied, and separates measurement targets using electrostatic attraction force.

10. The flow cytometer system according to claim 9, wherein the biologically derived substance includes a particle that is labeled with a same fluorescent dye as a fluorescent dye of the biologically derived particle.

11. A sorting system comprising:
a laser light source that irradiates a biologically derived particle with light, the biologically derived particle flowing in a flow path;
a photodetector that detects light from the biologically derived particle;
a dimension compression section that generates dimension-compressed data for measurement data on a basis of a learning model, the measurement data being obtained by the photodetector; and
a sorting section that sorts the biologically derived particle on a basis of the dimension-compressed data, wherein
the learning model is generated by a neural network in which same data acquired from a biologically derived substance is applied to an input layer and an output layer; and
the sorting section charges a droplet, passes the droplet through deflection plates where a voltage is applied, and separates measurement targets using electrostatic attraction force.

12. The sorting system according to claim 11, wherein data used to generate the learning data includes multi-dimensional data acquired from the biologically derived particle in advance.

13. An information processing method comprising:
generating, by an arithmetic processing device, dimension-compressed data for input data on a basis of a learning model generated by a neural network in which same data acquired from a biologically derived substance is applied to an input layer and an output layer;
wherein the input data includes multi-dimensional data acquired from the biologically derived substance; and
the input data includes data that is same as data used to generate the learning model; and
the input data includes multi-dimensional data acquired from a biologically derived particle, the multi-dimensional data including fluorescence intensity or scattered light intensity;
further comprising a sorting control section that controls a sorting section, the sorting section sorting, on a basis of the dimension-compressed data, the biologically derived particle from which the input data is acquired;
wherein the sorting section charges a droplet, passes the droplet through deflection plates to which a voltage is applied, and separate measurement targets using electrostatic attraction force.

* * * * *